United States Patent
Williamson et al.

(10) Patent No.: US 12,202,956 B2
(45) Date of Patent: Jan. 21, 2025

(54) BIMODAL POLYETHYLENE-BASED COMPOSITION

(71) Applicant: Dow Global Technologies LLC, Midland, MI (US)

(72) Inventors: Alexander Williamson, Rosharon, TX (US); Andrew T. Heitsch, Angleton, TX (US); Stephanie M. Whited, South Charleston, WV (US); Mridula Babli Kapur, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 4 days.

(21) Appl. No.: 17/597,978

(22) PCT Filed: Aug. 19, 2020

(86) PCT No.: PCT/US2020/046898
§ 371 (c)(1),
(2) Date: Mar. 24, 2022

(87) PCT Pub. No.: WO2021/041095
PCT Pub. Date: Mar. 4, 2021

(65) Prior Publication Data
US 2024/0209193 A1 Jun. 27, 2024

Related U.S. Application Data

(60) Provisional application No. 62/891,649, filed on Aug. 26, 2019.

(51) Int. Cl.
| | |
|---|---|
| *C08L 23/06* | (2006.01) |
| *C08F 4/6592* | (2006.01) |
| *C08F 10/02* | (2006.01) |
| *C08J 5/18* | (2006.01) |
| *C08K 5/00* | (2006.01) |

(Continued)

(52) U.S. Cl.
CPC ............ *C08L 23/06* (2013.01); *C08F 4/6592* (2013.01); *C08F 10/02* (2013.01); *C08J 5/18* (2013.01); *C08F 2/001* (2013.01); *C08F 2/34* (2013.01); *C08F 2500/05* (2013.01); *C08J 2323/06* (2013.01); *C08J 2423/06* (2013.01);

(Continued)

(58) Field of Classification Search
CPC ................ C08L 23/06; C08L 2203/16; C08L 2203/163; C08F 10/02; C08F 2/001; C08F 2/34; C08F 2500/07; C08F 2500/12; C08K 5/0083
See application file for complete search history.

(56) References Cited

U.S. PATENT DOCUMENTS

| | | | | |
|---|---|---|---|---|
| 1,195,861 A | * | 8/1916 | Wang | ..................... H01R 39/04 |
| | | | | 310/236 |
| 1,195,862 A | * | 8/1916 | Wang | ..................... G01C 22/00 |
| | | | | 235/91 PR |
| 3,709,853 A | | 1/1973 | Karapinka | |
| 4,003,712 A | | 1/1977 | Miller | |
| 4,011,382 A | | 3/1977 | Levine et al. | |
| 4,302,566 A | | 11/1981 | Karol et al. | |
| 4,588,790 A | | 5/1986 | Jenkins, III et al. | |
| 4,882,400 A | | 11/1989 | Dumain et al. | |

(Continued)

FOREIGN PATENT DOCUMENTS

| | | |
|---|---|---|
| BE | 839380 | 9/1976 |
| CN | 1207337 | 2/1999 |

(Continued)

OTHER PUBLICATIONS

IUPAC, Compendium of Chemical Terminology, Gold Book, 2014, vol. 2.3.3.
PCT/US2020/046898, International Search Report and Written Opinion with a mailing date of Nov. 30, 2020.
Williams, J. Polym. Sci,. Polym. Let. 1968, p. 621, vol. 6.
Search Report from corresponding Chinese Application No. 202080058578.6 dated Jun. 27, 2023.

*Primary Examiner* — Rip A Lee

(57) ABSTRACT

A bimodal polyethylene-based composition that is useful for making under film extrusion conditions a film that beneficially has both decreased water vapor transmission rate and decreased haze. The composition comprises an improved design of the composition of the polyethylene blend of a higher molecular weight polyethylene polymer constituent and a lower molecular weight polyethylene polymer constituent and an effective amount of a nucleating agent. Additional embodiments include a method of making the bimodal polyethylene-based composition, a formulation comprising the bimodal polyethylene-based composition and at least one additive, a method of making a manufactured article from the bimodal polyethylene-based composition or formulation; the manufactured article made thereby, use of the bimodal polyethylene-based composition for protecting a moisture-sensitive material, and a sealed package made therefrom. A bimodal polyethylene-based composition that is useful for making under film extrusion conditions a film that beneficially has both decreased water vapor transmission rate and decreased haze. The composition comprises an improved design of the composition of the polyethylene blend of a higher molecular weight polyethylene polymer constituent and a lower molecular weight polyethylene polymer constituent and an effective amount of a nucleating agent. Additional embodiments include a method of making the bimodal polyethylene-based composition, a formulation comprising the bimodal polyethylene-based composition and at least one additive, a method of making a manufactured article from the bimodal polyethylene-based composition or formulation; the manufactured article made thereby, use of the bimodal polyethylene-based composition for protecting a moisture-sensitive material, and a sealed package made therefrom.

15 Claims, No Drawings

(51) Int. Cl.
  *C08F 2/00* (2006.01)
  *C08F 2/34* (2006.01)
(52) U.S. Cl.
  CPC ...... *C08K 5/0083* (2013.01); *C08L 2203/162* (2013.01); *C08L 2205/24* (2013.01)

(56) References Cited

U.S. PATENT DOCUMENTS

| | | | |
|---|---|---|---|
| 4,988,783 A | 1/1991 | Beran et al. | |
| 4,994,534 A | 2/1991 | Rhee et al. | |
| 5,342,868 A | 8/1994 | Kimura et al. | |
| 5,352,749 A | 10/1994 | DeChellis et al. | |
| 5,462,999 A | 10/1995 | Griffin et al. | |
| 5,541,270 A | 7/1996 | Chinh et al. | |
| 5,627,242 A | 5/1997 | Jacobsen et al. | |
| 5,665,818 A | 9/1997 | Tilston et al. | |
| 5,677,375 A | 10/1997 | Rifi et al. | |
| 5,804,678 A | 9/1998 | Morita et al. | |
| 5,981,636 A | 11/1999 | Amos et al. | |
| 6,175,027 B1 | 1/2001 | Sullivan et al. | |
| 6,465,551 B1 | 10/2002 | Zhao et al. | |
| 6,489,408 B2 | 12/2002 | Mawson et al. | |
| 6,599,971 B2 | 7/2003 | Dotson et al. | |
| 6,794,433 B2 | 9/2004 | Dotson et al. | |
| 7,048,882 B2 * | 5/2006 | Vahala .................. | B29C 48/15 525/240 |
| 8,076,421 B2 | 12/2011 | Kapur et al. | |
| 8,436,085 B2 | 5/2013 | Borke et al. | |
| 8,445,594 B2 | 5/2013 | Michie, Jr. et al. | |
| 8,497,330 B2 | 7/2013 | Hussein et al. | |
| 8,580,893 B2 * | 11/2013 | McLeod .................. | C08L 23/06 525/240 |
| 9,056,970 B2 | 6/2015 | Davis et al. | |
| 9,175,111 B2 | 11/2015 | Kapur et al. | |
| 9,587,093 B2 * | 3/2017 | Aubee .................... | C08L 23/06 |
| 9,644,087 B2 | 5/2017 | Aubee et al. | |
| 9,815,975 B2 | 11/2017 | Chandak et al. | |
| 9,850,369 B2 | 12/2017 | Aubee et al. | |
| 9,962,913 B2 | 5/2018 | Osborn et al. | |
| 10,023,730 B2 | 7/2018 | Lam et al. | |
| 10,066,093 B2 | 9/2018 | Aubee et al. | |
| 10,377,887 B2 * | 8/2019 | Wang ..................... | C08L 23/08 |
| 11,046,841 B2 * | 6/2021 | Lin ......................... | C08L 23/06 |
| 11,149,137 B2 * | 10/2021 | Wang ..................... | C08L 23/0815 |
| 11,203,653 B2 | 12/2021 | Borse et al. | |
| 11,302,459 B2 * | 4/2022 | Doufas .................. | B29C 48/06 |
| 11,345,799 B2 * | 5/2022 | Whited .................. | A01G 25/02 |
| 11,359,081 B2 * | 6/2022 | Wang ..................... | C08L 23/0815 |
| 11,447,620 B2 * | 9/2022 | Michie, Jr. ............. | C08L 23/08 |
| 2009/0029182 A1 | 1/2009 | Aubee et al. | |
| 2011/0034635 A1 | 2/2011 | Kapur et al. | |
| 2011/0143155 A1 | 6/2011 | Aubee et al. | |
| 2014/0179873 A1 | 6/2014 | Lam et al. | |
| 2015/0051364 A1 | 2/2015 | Vahteri et al. | |
| 2015/0132593 A1 | 5/2015 | Borse et al. | |
| 2017/0210891 A1 | 7/2017 | Kapur et al. | |
| 2018/0371217 A1 * | 12/2018 | Yijian .................... | C08K 5/053 |
| 2019/0031867 A1 | 1/2019 | Michie, Jr. et al. | |

FOREIGN PATENT DOCUMENTS

| | | | | |
|---|---|---|---|---|
| DE | 102013020293 | | 6/2015 | |
| EP | 634421 | | 1/1995 | |
| EP | 0794200 | | 9/1997 | |
| EP | 0802202 | | 10/1997 | |
| EP | 2831167 A1 | | 2/2015 | |
| WO | 2009012565 | | 1/2009 | |
| WO | 2009130200 | | 10/2009 | |
| WO | 2010025342 | | 3/2010 | |
| WO | 2010025342 A2 | | 3/2010 | |
| WO | 2011069239 | | 6/2011 | |
| WO | 2013118413 | | 8/2013 | |
| WO | 2016034964 | | 3/2016 | |
| WO | 2017112503 | | 6/2017 | |
| WO | 2017112510 | | 6/2017 | |
| WO | WO-2018055493 A1 * | 3/2018 | ........... | C08K 5/0083 |
| WO | WO-2018089195 A1 * | 5/2018 | .............. | C08F 10/02 |
| WO | WO-2019229209 A1 * | 12/2019 | .......... | B29C 43/003 |
| WO | WO-2020115622 A1 * | 6/2020 | ............. | B01J 19/06 |
| WO | WO-2020157619 A1 * | 8/2020 | ........... | C08F 210/02 |

* cited by examiner

BIMODAL POLYETHYLENE-BASED COMPOSITION

FIELD

Polyethylene polymers and related methods and articles.

INTRODUCTION

Patent application publications and patents in or about the field include US 2009/0029182 A1; US 2011/0143155 A1; US2017/0210891 A1; US 2018/0371217 A1; US 2019/0031867 A1; U.S. Pat. Nos. 5,342,868; 5,981,636; 6,465,551 B1; U.S. Pat. No. 6,599,971 B2; U.S. Pat. No. 6,794,433 B2US 8,445,594 B2; U.S. Pat. No. 9,056,970 B2; U.S. Pat. No. 9,644,087 B2; U.S. Pat. No. 9,815,975 B2; U.S. Pat. No. 9,850,369 B2; and U.S. Pat. No. 10,066,093 B2.

SUMMARY

Certain polyethylene compositions are used to make moisture barrier films and containers in packaging applications. They protect moisture sensitive materials such as dry foodstuffs and pharmaceuticals from unwanted hydrating or hydrolyzing effects of external moisture. These films often have poor optical properties such as haze, making them unsuitable for aesthetic packaging or inspecting package contents. We discovered that additions of a nucleating agent to prior polyethylene compositions did not decrease haze enough or at all.

We describe an improved composition of a polyethylene blend (bimodal base resin) that, when formulated with an effective amount of a nucleating agent, gives a bimodal polyethylene-based composition that may be extruded to make a film having improved water vapor barrier performance (i.e., decreased water vapor transmission rate) and improved optical performance (i.e., decreased haze). The amount of decrease in haze is significantly beyond our expectations.

The bimodal PE-based composition comprises a formulated blend of a higher molecular weight polyethylene polymer constituent (HMW PE constituent) and a lower molecular weight polyethylene polymer constituent (LMW PE constituent) and an effective amount of a nucleating agent. Also a method of making the bimodal PE-based composition, a formulation comprising the bimodal PE-based composition and at least one additive, a method of making a manufactured article from the bimodal PE-based composition or formulation; the manufactured article made thereby, use of the bimodal PE-based composition or formulation for protecting a moisture-sensitive material, and a sealed package made therefrom.

DETAILED DESCRIPTION

The bimodal polyethylene-based composition ("bimodal PE-based composition") comprises the formulated blend of the higher molecular weight polyethylene polymer constituent (HMW PE constituent) and the lower molecular weight polyethylene polymer constituent (LMW PE constituent) and the effective amount of the nucleating agent. The formulated blend may be in the form of a powder, granules, or pellets. As used here "formulated blend" means a cooled melt blend, which is made by blending a melt of the HMW PE and LMW PE constituents with the nucleating agent, and cooling the resulting dispersion below the crystallization temperature of the HMW and LMW PE constituents to give the formulated blend as a solid. The bimodal PE-based composition is characterized such that when it is melted, and the melt is shaped under film extrusion conditions to give a solid film defining a geometric plane, the WVTR and haze properties of the film are decreased far beyond what we expected. Without being bound by theory, it is believed that the decrease in WVTR and extra decrease in haze is an inherent result of using the polyethylene blend (also called a bimodal base resin) and nucleating agent in the bimodal PE-based composition, and extruding the film.

Additional inventive aspects follow; some are numbered for easy cross-referencing.

Aspect 1. A bimodal polyethylene-based composition comprising a formulated blend of a higher molecular weight polyethylene polymer constituent (HMW PE constituent), a lower molecular weight polyethylene polymer constituent (LMW PE constituent), and an effective amount of at least 65 parts per million weight (ppmw) of a nucleating agent. The HMW PE constituent has a high load melt index ("HLMI" or "$I_{21}$" or "$I_{21.6}$") from 3 to 12 g/10 min., alternatively from 4 to 12 g/10 min., alternatively from 4 to 8 g/10 min., alternatively from 5.0 to 12 g/10 min., alternatively from 5 to 7 g/10 min. The bimodal HDPE composition has an overall melt index ($I_2$) from 0.50 to 2.5 g/10 min., alternatively from 0.75 to 2.5 g/10 min., alternatively from 0.80 to 2.0 g/10 min., alternatively from 1.05 to 1.70 g/10 min.; an overall melt flow ratio ("MFR" or "$I_{21}/I_2$" or "$I_{21.6}/I_{2.16}$") from 20 to 40, alternatively from 20.1 to 34, alternatively from 21 to 30, alternatively from 23 to 29; and an overall density from 0.935 to 0.970, alternatively from 0.947 to 0.970, alternatively from 0.955 to 0.967, alternatively 0.961 to 0.967 gram per cubic centimeter (g/cm$^3$), measured according to ASTM D792-08 (Method B, 2-propanol). Each $I_2$ is measured according to ASTM D1238-10 (190° C., 2.16 kg) and each $I_{21}$ is measured according to ASTM D1238-10 (190° C., 21.6 kg). In some embodiments the HMW PE constituent has a high load melt index ("HLMI" or "$I_{21}$" or "$I_{21.6}$") from 4 to 12 g/10 min. and the bimodal HDPE composition has an overall melt index ($I_2$) from 0.75 to 2.5 g/10 min. The term "overall" refers to a polymer property value measured for the bimodal HDPE composition itself, rather than a polymer property value measured for the HMW PE constituent in the absence of the LMW PE constituent or vice versa. The use of "overall" is optional, however, and if the term is omitted, it is nevertheless inherent when referring to a polymer property value of the bimodal HDPE composition. Each of the HMW and LMW PE constituents independently is a polyethylene homopolymer or a poly(ethylene-co-1-alkene) copolymer having from greater than 0 to 1.0 weight percent (wt %), alternatively from >0 to 0.5 wt % of comonomeric content (i.e., 1-alkenic content).

Aspect 2. The bimodal polyethylene-based composition of aspect 1 wherein the HMW PE constituent is characterized by any one of features (i) to (v): (i) a melt index ("MI" or "$I_2$" or "$I_{2.16}$") from 0.195 to 0.70 g/10 min., alternatively from 0.200 to 0.700 g/10 min., alternatively from 0.30 to 0.70 g/10 min., alternatively from 0.32 to 0.59 g/10 min., alternatively from 0.34 to 0.56 g/10 min., alternatively from 0.3 to 0.6 g/10 min., alternatively from 0.21 to 0.60 g/10 min., alternatively from 0.22 to 0.56 g/10 min., alternatively from 0.23 to 0.45 g/10 min., alternatively from 0.23 to 0.39 g/10 min., alternatively from 0.25 to 0.40 g/10 min., alternatively from 0.30 to 0.39 g/10 min., alternatively from 0.51 to 0.59 g/10 min., measured according to ASTM D1238-10 (190° C., 2.16 kg); (ii) a density from 0.940 to 0.960 g/cm$^3$, alternatively from 0.945 to 0.957 g/cm$^3$, alternatively from 0.947 to 0.957 g/cm$^3$, alternatively from 0.948 to 0.952 g/cm$^3$, alternatively from 0.948 to 0.951 g/cm$^3$, alternatively from 0.949 to 0.951 g/cm$^3$, alternatively from 0.945 to 0.949 g/cm$^3$, measured according to ASTM D792-08 (Method B, 2-propanol); (iii) a weight-average molecular weight (M$_W$) from 100,000 to 225,000 g/mol, alternatively from 150,000 to 200,000 g/mol, alternatively from 160,000 to 180,000 g/mol, as measured by the GPC Test Method; (iv) a melt flow ratio (I$_{21}$/I$_2$) from 15 to 25, alternatively from 15 to 20, alternatively from 16 to 19, alternatively from 16 to 25, alternatively from 16 to 18; and (v) a complex viscosity from 10,000 to 100,000 pascal-seconds (Pa·s), alternatively from 20,000 to 60,000 Pa·s, alternatively from 32,000 to 44,000 Pa·s, as measured by dynamic mechanical analysis (DMA) at 0.1 radian per second (rad/s) and 190° C. using the Complex Viscosity Test Method. Some aspects have any one of feature combinations (vi) to (xvii): (vi) both (i) and (ii); (vii) both (i) and (iii); (viii) both (i) and (iv); (ix) both (i) and (v); (x) both (ii) and (iii); (xi) both (ii) and (iv); (xii) both (ii) and (v); (xiii) both (iii) and (iv); (xiv) both (iii) and (v); (xv) both (iv) and (v); (xvi) any four of (i) to (v); and (xvii) each of (i) to (v).

Aspect 3. The bimodal polyethylene-based composition of aspect 1 or 2 wherein the bimodal PE-based composition is characterized by any one of features (i) to (iv): (i) an amount of the HMW PE constituent of from 35 to 70 wt %, alternatively from 45 to 70 wt %, alternatively from 50 to 66 wt %, alternatively from 45 to 66 wt %, alternatively from 51 to 66 wt % and an amount of the LMW PE constituent of from 65 to 30 wt %, alternatively from 55 to 30 wt %, alternatively from 50 to 34 wt %, alternatively from 55 to 34 wt %, alternatively from 49 to 34 wt % respectively, based on the combined weight of the HMW PE and LMW PE constituents; (ii) an overall density from 0.955 to 0.967 g/cm$^3$, alternatively from 0.957 to 0.964 g/cm$^3$; (iii) an overall high load melt index (I$_{21}$) from 18 to 85 g/10 min., alternatively from 20 to 80 g/10 min., alternatively from 25 to 85 g/10 min., alternatively from 30 to 80 g/10 min., alternatively from 31 to 50 g/10 min., alternatively from 31 to 42 g/10 min., measured according to ASTM D1238-10 (190° C., 21.6 kg); and (iv) an overall melt flow ratio (I$_{21}$/I$_2$) from 20.0 to 39.4, alternatively from 21 to 30, alternatively from 23 to 29. Some aspects have any one of feature combinations (v) to (xii): (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv).

Aspect 4. The bimodal polyethylene-based composition of any one of aspects 1 to 3 wherein at least one, alternatively each, of the HMW PE constituent and the LMW PE constituent is a polyethylene homopolymer.

Aspect 5. The bimodal polyethylene-based composition of any one of aspects 1 to 4 characterized by any one of features (i) to (iv): (i) the effective amount of the nucleating agent is from 150 to 1,100 parts per million weight (ppmw), alternatively from 155 to 840 ppmw, alternatively from 191 to 814 ppmw; (ii) the nucleating agent comprises a calcium 1,2-dicarboxylate salt, wherein the 1,2-dicarboxylate salt is a dianion of formula (I): —OOC—CH(R$^2$)—CH(R$^3$)—COO— (1), wherein R$^2$ and R$^3$ are independently H or a (C$_1$ to C$_4$)alkyl or R$^2$ and R$^3$ are bonded to each other to give a (C$_3$ to C$_4$)alkylene; and wherein the Group 2 metal is magnesium or calcium; (iii) the nucleating agent comprises calcium cyclohexane-1,2-dicarboxylate salt (1:1); and (iv) the bimodal polyethylene-based composition further comprises at least one of calcium stearate (1:2), calcium palmitate (1:2), zinc palmitate (1:2), and zinc stearate (1:2). Some aspects have any one of feature combinations (v) to (ix): (v) both (i) and (ii); (vi) both (i) and (iii); (vii) both (ii) and (iv); (viii) both (iii) and (iv); and (ix) a combination of (i), (iii), and (iv). The calcium 1,2-dicarboxylate salt may be the only nucleating agent in the bimodal PE-based composition. The nucleating agent may be added to the bimodal PE-based composition in the form of a nucleating formulation that comprises a combination of the calcium 1,2-dicarboxylate salt (e.g., calcium cyclohexane-1,2-dicarboxylate (1:1)) and at least one of zinc palmitate and zinc stearate. The nucleating formulation may comprise from 60 to 70 wt % of the calcium 1,2-dicarboxylate salt (e.g., calcium cyclohexane-1,2-dicarboxylate) and from 40 to 30 wt %, respectively, of a combination of zinc stearate and zinc palmitate.

Aspect 6. The bimodal polyethylene-based composition of any one of aspects 1 to 5 characterized by any one of features (i) to (iii): (i) a water vapor transmission rate (WVTR) of less than 0.25 (grams*25.4 micrometers)/(0.0645 square meter*day), alternatively a WVTR from less than 0.23 (grams*25.4 micrometers)/(0.0645 square meter*day), alternatively a WVTR from 0.05 to 0.20 (grams*25.4 micrometers)/(0.0645 square meter*day), as measured according to ASTM F1249-06 at 38° C., 100% relative humidity, on a film of the composition, the film having a thickness of about 50 micrometers (μm; 2 mils) (according to the WVTR Test Method described later); (ii) normalized haze of less than 33.0 percent (%), wherein actual haze is measured according to ASTM D1003-07 (according to the Haze Test Method described later) on a film of the composition, the film having an actual thickness of about 50 μm; and the normalized haze is calculated by multiplying the actual haze times a film thickness ratio equal to 50.8 μm/(actual film thickness value); and both (i) and (ii). 50.8 μm=2.00 mils. In some embodiments the normalized haze is less than 28%, alternatively less than 26.0%, alternatively less than 25%, alternatively less than 24.1%, alternatively less than 22%. The normalized haze may be at least 10%, alternatively at least 12%, alternatively at least 14%. In some embodiments the normalized haze is from 15.0% to 32.6%, alternatively from 15.0% to 27.1%, alternatively from 15.1% to 24.1%, alternatively normalized haze from 15.0% to 22.0%. In some embodiments actual haze is less than or equal to 23%, alternatively actual haze less than or equal to 20%, alternatively actual haze is from 10% to 20.0%, alternatively actual haze is from 10.1% to 19.9%, alternatively actual haze is from 11% to 19.4%, alternatively actual haze is from 12% to 19.0%. Some aspects have both features (i) and (ii). In some aspects the WVTR is from 0.10 to 0.18 (grams*25.4 micrometers)/(0.0645 square meter*day) and the haze is from 12% to 18%. In some aspects the HMW PE constituent has a melt index (I$_2$) from 0.30 to 0.39 g/10 min.; and the bimodal polyethylene-based composition has an overall melt index (I$_2$) from 1.10 to 1.70 g/10 min., an overall density from 0.961 to 0.966 g/cm$^3$, the WVTR is from 0.10 to 0.18 (grams*25.4 micrometers)/(0.0645 square meter*day), and the haze is from 12% to 18%. In some aspects the HMW and LMW PE constituents of the formulated blend are made by a substantially single site olefin polymerization catalyst (e.g., a metallocene catalyst) gas phase polymerization under gas phase polymerization conditions.

Aspect 7. A method of making the bimodal polyethylene-based composition of any one of aspects 1 to 6, the method comprising contacting ethylene and, optionally, an effective amount of a 1-alkene, with an effective polymerization catalyst in a first polymerization reactor under effective polymerization conditions to give the HMW PE constituent or the LMW PE constituent, but not both; conveying the HMW PE constituent or the LMW PE constituent, respectively, into a second polymerization reactor, which is different than the first polymerization reactor; in the second polymerization reactor contacting the conveyed HMW PE or LMW PE constituent, respectively, with additional ethylene and, optionally, an effective amount of a second 1-alkene, and, optionally, a fresh amount of a same or different effective polymerization catalyst, to give the polyethylene blend comprising the HMW PE constituent and the LMW PE constituent; melting the polyethylene blend and blending the melt with an effective amount of a nucleating agent to give a melt blend comprising the nucleating agent dispersed within the melt blend of the HMW and LMW PE constituents; and cooling the melt blend to give the bimodal polyethylene-based composition. In some aspects the 1-alkene is absent, alternatively is present and the effective amount is no more than a quantity that gives a comonomeric content of 1.0 wt %. In some aspects the first polymerization reactor is a first gas phase polymerization (GPP) reactor and the second polymerization reactor is a second GPP reactor. In some aspects the effective polymerization catalyst is made by contacting bis(n-propylcyclopentadienyl)hafnium $X_2$ complex, wherein each X independently is Cl, methyl, 2,2-dimethylpropyl, —$CH_2Si(CH_3)_3$, or benzyl, with an activator. In some aspects the fresh amount of a same or different effective polymerization catalyst is not added into the second polymerization reactor. The first and second 1-alkenes independently may be the same or different and independently may be absent from the method or used in the method in an amount that gives the comonomeric content of the poly(ethylene-co-1alkene) copolymer. The effective polymerization catalyst may be a catalyst system may consist essentially of a metallocene catalyst that is bis(n-propylcyclopentadienyl)hafnium dichloride or dimethyl, optionally a host material, and optionally an activator (excess amount thereof). The host material, when present, may be selected from at least one of an inert hydrocarbon liquid (inert means free of carbon-carbon double or triple bonds) and a solid support (e.g., an untreated silica or hydrophobic agent-surface treated fumed silica).

Aspect 8. A formulation comprising the bimodal polyethylene-based composition of any one of aspects 1 to 6 and at least one additive. The at least one additive is different than the HMW PE constituent, LMW PE constituent, and nucleating agent. The bimodal PE-based composition may be made according to the method of aspect 7.

Aspect 9. A manufactured article comprising the bimodal PE-based composition of any one of aspects 1 to 6 or the formulation of aspect 8.

Aspect 10. A method of making a manufactured article, the method comprising extruding a melt of the bimodal polyethylene-based composition of any one of aspects 1 to 6, or the formulation of aspect 8, under effective conditions so as to make the manufactured article. The effective conditions of the method comprise cooling the extruded melt to give the manufactured article. In the method, the extruding may comprise restricting the melt in one dimension so as to give an embodiment of the manufactured article that is restricted in one dimension. The embodiment of the manufactured article that is restricted in one dimension may be a two-dimensional manufactured article such as a film or a coating. Alternatively, the embodiment of the manufactured article that is restricted in one dimension may be shaped into a three-dimensional manufactured article such as a container having a bottom, wall, and/or top comprising the embodiment of the manufactured article that is restricted in one dimension.

Aspect 11. An extruded film made by extruding a melt of the bimodal polyethylene-based composition of any one of aspects 1 to 6 or the formulation of aspect 8 in a film extrusion process (e.g., a blown film process or cast film process) to give a solid film. The extruded film may be free of other polyethylenes or the extruded film may be a blended monolayer film, or a multi-layer film containing the blended monolayer film, that is made in-situ by co-extruding a melt of the bimodal polyethylene-based composition and a melt of a non-inventive polyethylene composition such as a high-density polyethylene or a linear low-density polyethylene. The amount of the non-inventive polyethylene in the blended monolayer film is not so high that the blended monolayer film fails to have the decreased haze, alternatively the decreased haze and decreased WVTR. The extruded film may be free of other layers or may be a layer of a multi-layer film. At least one layer of the multi-layer film comprises the inventive film. The extruded film inherently has the decreased WVTR and extra decreased haze. If the same bimodal PE-based composition would be used without the nucleating agent, the resulting comparative extruded film would not have the decreased WVTR and extra decreased haze. It is convenient to demonstrate the improved WVTR and haze using standard test methods and standard film thickness. Embodiments of the extruded film may have a thickness of from 0.020 to 0.10 millimeter (e.g., a thickness of about 0.050 mm=50 µm) and may be characterized by any one of features (i) to (iii): (i) a water vapor transmission rate (WVTR) of less than 0.25 (grams*25.4 micrometers)/(0.0645 $m^2$*day), alternatively a WVTR from less than 0.23 (grams*25.4 micrometers)/(0.0645 square meter*day), as measured according to ASTM F1249-06 at 38° C., 100% relative humidity, on a film having a thickness of about 50 µm; (ii) normalized haze of less than 26.0 percent (%); and (iii) both features (i) and (ii). Those embodiments of the extruded film may be further characterized by any one of features (i) to (iii): (i) a WVTR of less than 0.23 (grams*25.4 micrometers)/(0.0645 $m^2$*day), alternatively a WVTR from 0.05 to 0.20 (grams*25.4 micrometers)/(0.0645 $m^2$*day), alternatively from 0.08 to 0.19 (grams*25.4 micrometers)/(0.0645 $m^2$*day), alternatively from 0.10 to 0.14 (grams*25.4 micrometers)/(0.0645 $m^2$*day); (ii) a normalized haze from 10% to 25.0%, alternatively from 11% to 24.5%, alternatively from 15.0% to 24.1%; (iii) both (i) and (ii). The extruded film may be flexible or rigid. The extruded film may contain the nucleating agent in an effective amount of from 150 to 1,100 weight parts per million (ppmw) based on total weight of the HMW and LMW PE constituents. The nucleating agent may be as described above.

Aspect 12. A method of protecting a moisture-sensitive material in need of such protection, the method comprising hermetically sealing the moisture-sensitive material inside a package comprising the extruded film of aspect 11 to give a sealed package. The method protects the moisture-sensitive material from water or water vapor from a source thereof external to the sealed package. In some aspects the moisture-sensitive material is hygroscopic or prone to being hydrolyzed. Examples of the moisture-sensitive material are a dry foodstuff (e.g., cookie or breakfast cereal), a hygroscopic pharmaceutical material (e.g., hygroscopic active pharmaceutical ingredient or hygroscopic excipient), or an active pharmaceutical ingredient (API) that is prone to hydrolysis. An example of an API prone to hydrolysis is fesoterodine fumarate, a compound used to treat urinary incontinence, and which tends to degrade when exposed to moisture, forming among other things a deacylated compound (U.S. Pat. No. 9,629,805 B2). The extruded film in the sealed package may function as a haze-free moisture-barrier film.

Aspect 13. A sealed package made by the method of aspect 12.

Aspect 14. A bimodal polyethylene-based composition (bimodal PE-based composition) comprising a formulated blend of a higher molecular weight polyethylene polymer constituent (HMW PE constituent), a lower molecular weight polyethylene polymer constituent (LMW PE constituent), and at least 65 parts per million weight (ppmw) of a nucleating agent, alternatively from 150 to 940 ppmw of nucleating agent, alternatively from 155 to 820 ppmw of nucleating agent; and the composition having a water vapor transmission rate (WVTR) of less than 0.23 (grams*25.4 micrometers)/(0.0645 square meter*day), as measured according to ASTM F1249-06 at 38° C., 100% relative humidity, on a film having a thickness of about 50 micrometers (μm) and a normalized haze of less than 27.0 percent (%), alternatively normalized haze less than 26.0%, alternatively normalized haze less than 25%, alternatively normalized haze less than 24.1%, alternatively normalized haze less than 22%, alternatively normalized haze from 15.0% to 25.4%, alternatively normalized haze from 15.0% to 25.1%, alternatively normalized haze from 15.1% to 24.1%, alternatively normalized haze from 15.0% to 22.0%, wherein actual haze is measured according to ASTM D1003-07 on a film of the composition, the film having an actual thickness of about 50 μm; and wherein the normalized haze is calculated by multiplying the actual haze times a film thickness ratio equal to 50.8 μm (2.00 mils)/(actual film thickness value). In some aspects the HMW and LMW PE constituents are chosen such that the formulated blend containing same and 400 ppmw or higher, alternatively 800 ppmw or higher of a calcium 1,2-dicarboxylate salt (e.g., calcium cyclohexane-1,2-dicarboxylate (1:1)), the bimodal PE-based composition may have a WVTR of less than 0.15 (grams*25.4 micrometers)/(0.0645 square meter*day) and a normalized haze is less than 22.0%.

Aspect 15. A film made from the bimodal PE-based composition of aspect 14.

The bimodal PE-based composition, and manufactured articles such as films, have decreased water vapor transmission rate (WVTR, i.e., water permeation rate) as measured by the WVTR Test Method and decreased haze as measured by the Haze Test Method. This unique combination of properties enables use of the manufactured articles, including extruded films such as extruded moisture barrier films and extruded containers such as extruded moisture barrier containers, for protecting a moisture-sensitive material in need of moisture protection.

The polyethylene blend may be made by any suitable ethylene polymerization method such as solution phase polymerization, slurry phase polymerization, or gas phase polymerization; alternatively, gas phase polymerization. In some aspects the polyethylene blend is made in a series of two gas phase polymerization reactors as described later. Thus, the polyethylene blend is an in-situ "reactor blend". The polyethylene blend may be in the form of finely-divided solid (solid particles) comprising a powder, granules, pellets, or a combination thereof. The polyethylene blend per se is free of the nucleating agent.

The bimodal PE-based composition is made in a post-reactor process from the polyethylene blend and the nucleating agent, and any optional additives, in a post-reactor process. In the post-reactor process, the polyethylene blend is melted to give a melt. The melting may be done in the presence or absence of the nucleating agent. The melt is mixed with the effective amount of a nucleating agent to give a bulk melt blend comprising the nucleating agent dispersed (substantially uniformly) within the melt of the polyethylene blend. The mixing may be done by any suitable means such as by melt mixing the HMW and LMW PE constituents with the nucleating agent constituent in a suitable device such as a static mixer or a single- or twin-screw extruder. During the mixing, the bulk melt blend may be maintained at a temperature above the melting temperature of the polyethylene blend, and either above or below the melting point of the nucleating agent. Typically the temperature is maintained below 240° C. The nucleating agent (e.g., a calcium cyclohexane-1,2-dicarboxylate) may melt above 240° C., whereas a zinc palmitate, if used, and/or zinc stearate, if used, may melt below 240° C. A typical bulk melt blend temperature during the mixing may be from 190° C. to 240° C. The temperature of the bulk melt blend may be varied or kept constant.

The melt mixing device used to make the bulk melt blend of the bimodal PE-based composition may be in melt-flow communication with a manufacturing line such as a pelletizer, a blown film manufacturing line, or a cable coating manufacturing line. There the bulk melt blend is shaped into the form of a manufactured article such as pellets, a film, or a component of a device such as a cylindrical coating layer of a coated conductor such as a power cable. The pellets may be made by shaping the bulk melt blend of the bimodal PE-based composition into a strand, cooling the strand, and pelletizing the cooled strand to give the pellets of the bimodal PE-based composition. The film may be made by extruding the bulk melt blend while it is being restricted in one dimension, and cooling the extruded film melt to make the film. The coating layer may be made by annularly extruding the bulk melt blend around a conductor (e.g., a copper wire) or around an interior layer of a coated conductor (e.g., around a semiconductive shield layer that surrounds a copper wire), and cooling the annularly extruded melt to make the coating layer. The bulk melt blend may be molded into a molded article (e.g., a bottle).

The cooling of the strand, extruded film melt, annularly extruded melt, or molded melt (collectively "shaped melt blend") may be passive or active and may initially occur from the temperature of the bulk melt blend down to an intermediate temperature of approximately 110° C. This allows the shaped melt blend to undergo enhanced nucleation and crystallization in the presence of the nucleating agent to give the bimodal PE-based composition as a solidified shape. Without being bound by theory, it is believed that during the cooling step, the nucleating agent provides a plurality of structured sites upon which initiation and growth of crystalline lamellae of polyethylene chains of the HMW and LMW PE constituents occur. Thereafter, the solidified shape may be further cooled from the intermediate temperature to ambient temperature (e.g., from 20° to 30° C.). If desired, the cooling rate may be controlled from about 130° C. to about 110° C., wherein the controlled cooling rate may be from 1° to 20° C. per minute.

Thus, the bimodal PE-based composition is useful for making manufactured articles. These are not limited to films. They include containers, films, sheets, fibers, and molded articles. Molded articles may be made by injection molding, rotation molding, or blow molding. Examples of the manufactured articles are bottles (e.g., small part extrusion blow molded bottles), films, coatings and toy parts. The films include shrink films, cling films, stretch films, sealing films, barrier films, oriented films, food packaging, heavy-duty grocery bags, grocery sacks, medical packaging, industrial liners, and membranes.

The bimodal PE-based composition consists essentially of the HMW and LMW PE components and the nucleating agent. Without being bound by theory, we believe that the combination of decreased WVTR and decreased haze of the bimodal PE-based composition results from a combination of the improved design of the composition of the polyethylene blend used to make the bimodal PE-based composition and the effect of the nucleating agent on that design in the bimodal PE-based composition. Without being bound by theory, we believe that these result-effective features function together to enhance nucleation and crystallization of the polyethylene chains of the polyethylene blend in such a way that WVTR is decreased and, surprisingly, haze is decreased more than predicted from the prior art. A way to demonstrate the benefits of the inventive polyethylene blend relative to a comparative base resin is to separately formulate each of the inventive polyethylene blend and the comparative base resin with a fixed amount of test nucleating agent, for example with 800 ppmw or 810 ppmw of calcium cyclohexane-1,2-dicarboxylate (1:1), and measure the WVTR and haze of the resulting inventive and comparative test compositions. If desired, the test compositions may each also contain the same fixed amount of one or more antioxidants such as those used in the Examples later. The resulting test bimodal PE-based composition may have a WVTR of less than 0.15 (grams*25.4 micrometers)/(0.0645 square meter*day) and a haze is less than 19%. In contrast, the comparative test composition that is formulated with the same amount of the calcium 1,2-dicarboxylate salt (e.g., calcium cyclohexane-1,2-dicarboxylate (1:1)) may have a WVTR of greater than 0.16 (grams*25.4 micrometers)/(0.0645 square meter*day) and/or a haze greater than 20%.

The composition of the polyethylene blend consists essentially of the higher molecular weight polyethylene polymer (HMW PE constituent) and the lower molecular weight polyethylene polymer (LMW PE constituent) without the nucleating agent. The "consists essentially of" means the polyethylene blend is free of the nucleating agent. Except for the nucleating agent the polyethylene blend optionally may contain any one or more additives described below for use in the bimodal PE-based composition. The optional one or more additives are different than the HMW and LMW PE constituents and the nucleating agent. The polyethylene blend may consist essentially of any one of the blends of the HMW and LMW PE constituents described herein for making the bimodal PE-based composition.

Each of the HMW and LMW PE constituents independently may be a polyethylene homopolymer or a poly(ethylene-co-1-alkene) copolymer having from greater than 0 to 1.0 wt % of comonomeric content (i.e., 1-alkenic content). In some aspects each of the HMW PE constituent and the LMW PE constituent independently is the polyethylene homopolymer. In other aspects the HMW PE constituent is the polyethylene homopolymer and the LMW PE constituent is either the polyethylene homopolymer or the poly(ethylene-co-1-alkene) copolymer. In other aspects the HMW PE constituent is either the polyethylene homopolymer or the poly(ethylene-co-1-alkene) copolymer and the LMW PE constituent is the polyethylene homopolymer. In other aspects each of the HMW and LMW PE constituents independently is the poly(ethylene-co-1-alkene) copolymer. In some aspects the comonomeric content (1-alkenic) content of the poly(ethylene-co-1-alkene) copolymer may be determined by nuclear magnetic resonance (NMR) and in aspects may be from >0 to 0.5 wt %, alternatively from >0 to 0.2 wt %. The terms "greater than 0" and ">0" include de minimis amounts that are not detectable by NMR. The de minimis amount may be known to exist from reactor operating conditions. These conditions include presence of a low comonomer/ethylene molar ratio ($C_X/C_2$ molar ratio) of 1-alkene comonomer in a first reactor during the step of making the HMW PE constituent and/or in a second reactor during the separate step of making the LMW PE constituent. Such a low $C_X/C_2$ molar ratio may occur during reactor transitions between polyethylene resin grades such as from a prior poly(ethylene-co-1-alkene) copolymer to the inventive polyethylene homopolymer or as may occur during steady-state production of the inventive poly(ethylene-co-1-alkene) copolymer, as the case may be.

The HMW and LMW PE constituents independently may be free of short-chain branches (SCBs). Alternatively, one or both of the HMW and LMW PE constituents independently may contain a low level of short-chain branches, obtained in absence of, and thus not derived from, any 1-alkene comonomer. Examples of such short-chain branches are methyl and ethyl branches. For example, there independently may be less than 1 methyl branches per 1000 carbon atoms in the HMW PE constituent and/or the LMW PE constituent. Short chain branches may be detected by NMR (nuclear magnetic resonance) techniques.

In some aspects the HMW PE constituent (of the bimodal polyethylene-based composition) is as described in any one of the preceding aspects.

In some aspects the LMW PE constituent (of the bimodal polyethylene-based composition) is characterized by any one of limitations (i) to (iii): (i) a density from 0.960 to 0.970 g/cm$^3$; (ii) a melt index ($I_2$) from 7 to 1,320 g/10 min.; and (iii) both (i) and (ii); wherein these properties of the LMW PE constituent are measured according to Low Molecular Weight Polyethylene (LMW PE) Property Determination Model, described later.

The 1-alkene comonomer used to make the poly(ethylene-co-1-alkene) copolymer embodiment(s) of the HMW and/or LMW PE constituent(s) of the polyethylene blend may be 1-propene, a ($C_4$-$C_8$)alpha-olefin, or a combination of any two or more of 1-propene and ($C_4$-$C_8$)alpha-olefin(s). Each ($C_4$-$C_8$)alpha-olefin independently may be 1-butene, 1-pentene, 1-hexene, 4-methyl-1-pentene, 1-heptene, or 1-octene. In some aspects the 1-alkene comonomer is 1-butene ($C_X/C_2$ molar ratio=$C_4/C_2$ molar ratio), alternatively 1-hexene ($C_X/C_2$ molar ratio=$C_6/C_2$ molar ratio), alternatively 1-octene ($C_X/C_2$ molar ratio=$C_8/C_2$ molar ratio), alternatively a combination of any two or more thereof (1-hexene and 1-butene: $C_X/C_2$ molar ratio=$(C_6+C_4)/C_2$ molar ratio).

The composition of the polyethylene blend may be made by making the HMW PE and LWM PE components using a suitable olefin polymerization catalyst in a polymerization process that is useful for making a polyethylene, such as a solution phase, slurry phase, or gas phase polymerization process; alternatively a gas phase polymerization. For example, the respective properties described herein for HMW and LMW PE constituents separately and the overall properties described herein for the bimodal PE-based composition (and the polyethylene blend) may be achieved by independently controlling the reactor operating conditions in a first gas phase polymerization reactor used to make the HMW PE constituent in the absence of the LMW PE constituent; and independently controlling the reactor operating conditions in a second gas phase polymerization reactor used to make the LMW PE constituent in the presence of the HMW PE constituent. The reactor operating conditions may be controlled as described herein so as to successfully make the polyethylene blend as an in-situ "reactor blend". The process conditions in the different reactors of the dual-reactor process independently may comprise bed temperature, ethylene partial pressure, the molar ratio of molecular hydrogen to ethylene ($H_2/C_2$ molar ratio), and, if relevant, the molar ratio of 1-alkene (if any) to ethylene ($C_X/C_2$ molar ratio).

The polymerization catalyst is made by contacting bis(n-propylcyclopentadienyl)hafnium $X_2$ complex, wherein each X independently is Cl, methyl, 2,2-dimethylpropyl, —$CH_2Si(CH_3)_3$, or benzyl ("bis(n-propylcyclopentadienyl) hafnium $X_2$"), with an activator. The activator may comprise a methylaluminoxane (MAO). The catalyst is available from The Dow Chemical Company, Midland, Michigan, USA or may be made by methods described in the art. An illustrative method is described later for making Spray-Dried Catalyst System 1.

The polymerization catalyst may be fed into a polymerization reactor(s) in "dry mode" or "wet mode". The dry mode is a dry powder or granules. The wet mode is a suspension in an inert liquid such as mineral oil or the ($C_5$-$C_{20}$)alkane(s). The bis(n-propylcyclopentadienyl)hafnium $X_2$ may be unsupported when contacted with an activator, which may be the same or different for different catalysts. Alternatively, the bis(n-propylcyclopentadienyl) hafnium $X_2$ may be disposed by spray-drying onto a solid support material prior to being contacted with the activator(s). The solid support material may be uncalcined or calcined prior to being contacted with the catalysts. The solid support material may be a hydrophobic fumed silica (e.g., a fumed silica treated with dimethyldichlorosilane). The unsupported or supported catalyst system may be in the form of a powdery, free-flowing particulate solid.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

The inorganic oxide support material is porous and has variable surface area, pore volume, and average particle size. In some embodiments, the surface area is from 50 to 1000 square meter per gram ($m^2/g$) and the average particle size is from 20 to 300 micrometers (μm). Alternatively, the pore volume is from 0.5 to 6.0 cubic centimeters per gram ($cm^3/g$) and the surface area is from 200 to 600 $m^2/g$. Alternatively, the pore volume is from 1.1 to 1.8 $cm^3/g$ and the surface area is from 245 to 375 $m^2/g$. Alternatively, the pore volume is from 2.4 to 3.7 $cm^3/g$ and the surface area is from 410 to 620 $m^2/g$. Alternatively, the pore volume is from 0.9 to 1.4 $cm^3/g$ and the surface area is from 390 to 590 $m^2/g$. Each of the above properties are measured using conventional techniques known in the art.

The support material may comprise silica, alternatively amorphous silica (not quartz), alternatively a high surface area amorphous silica (e.g., from 500 to 1000 $m^2/g$). Such silicas are commercially available from several sources including the Davison Chemical Division of W. R. Grace and Company (e.g., Davison 952 and Davison 955 products), and PQ Corporation (e.g., ES70 product). The silica may be in the form of spherical particles, which are obtained by a spray-drying process. Alternatively, MS3050 product is a silica from PQ Corporation that is not spray-dried. As procured, these silicas are not calcined (i.e., not dehydrated). Silica that is calcined prior to purchase may also be used as the support material.

Prior to being contacted with a catalyst, the support material may be pre-treated by heating the support material in air to give a calcined support material. The pre-treating comprises heating the support material at a peak temperature from 350° to 850° C., alternatively from 400° to 800° C., alternatively from 400° to 700° C., alternatively from 500° to 650° C. and for a time period from 2 to 24 hours, alternatively from 4 to 16 hours, alternatively from 8 to 12 hours, alternatively from 1 to 4 hours, thereby making a calcined support material. The support material may be a calcined support material.

Each polymerization catalyst is activated by contacting it with an activator. Any activator may be the same or different as another and independently may be a Lewis acid, a non-coordinating ionic activator, or an ionizing activator, or a Lewis base, an alkylaluminum, or an alkylaluminoxane (alkylalumoxane). The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, or tris(2-methylpropyl)aluminum. The alkylaluminum halide may be diethylaluminum chloride. The alkylaluminum alkoxide may be diethylaluminum ethoxide. The alkylaluminoxane may be a methylaluminoxane (MAO), ethylaluminoxane, 2-methylpropyl-aluminoxane, or a modified methylaluminoxane (MMAO). Each alkyl of the alkylaluminum or alkylaluminoxane independently may be a ($C_1$-$C_7$)alkyl, alternatively a ($C_1$-$C_6$)alkyl, alternatively a ($C_1$-$C_4$)alkyl. The molar ratio of activator's metal (Al) to a particular catalyst compound's metal (catalytic metal, e.g., Hf) may be 1000:1 to 0.5:1, alternatively 300:1 to 1:1, alternatively 150:1 to 1:1. Suitable activators are commercially available.

Once the activator and the bis(n-propylcyclopentadienyl) hafnium $X_2$ contact each other, the catalyst system is activated, and activator species may be made in situ. The activator species may have a different structure or composition than the catalyst and activator from which it is derived and may be a by-product of the activation of the catalyst or may be a derivative of the by-product. The activator species may be a derivative of the Lewis acid, non-coordinating ionic activator, ionizing activator, Lewis base, alkylaluminum, or alkylaluminoxane, respectively.

Each contacting step between activator and catalyst independently may be done either in a separate vessel outside a polymerization reactor or in a feed line to the reactor.

Each of the gas phase polymerization (GPP) reactors used to make the HMW and LMW PE constituents independently may be a fluidized-bed gas phase polymerization (FB-GPP) reactor. The FB-GPP reactor used to make the HMW PE constituent may be the same or different than the FB-GPP reactor used to make the LMW PE constituent. The catalyst system may be fed as a slurry or dry powder into the FB-GPP reactor from high pressure devices. The slurry is fed via a syringe pump and the dry powder is fed via a metered disk. The catalyst system typically enters the fluidized bed in the lower ⅓ of its bed height. The FB-GPP reactor further comprises a way of weighing the fluidized bed and isolation ports (Product Discharge System) for discharging polymer product from the reactor in response to an increase of the fluidized bed weight as polymerization reaction proceeds.

The FB-GPP reactor may have a fluidized resin bed at a bed temperature from 80 to 110 degrees Celsius (° C.), alternatively from 80° to 100° C., alternatively from 84° to 94° C., alternatively from 100° to 108° C., alternatively from 104° to 106° C. In some embodiments the bed temperature used to make the HMW PE constituent is from 89° to 98° C., alternatively from 91° to 95° C., alternatively from 92° to 94° C., alternatively 93° C.; and the bed temperature used to make the LMW PE constituent is from 81° to 89° C., alternatively from 83° to 87° C., from 84° to 86° C., alternatively 85° C. Each FB-GPP reactor independently may receive feeds of respective independently controlled amounts of ethylene and optionally hydrogen gas ($H_2$) characterized by a hydrogen-to-ethylene ($H_2/C_2$) molar ratio, and optionally an induced condensing agent (ICA) comprising a ($C_5$-$C_{10}$)alkane(s), e.g., isopentane. The ($H_2/C_2$) molar ratio may be from 0.0001 to 0.01. In some embodiments the $H_2/C_2$ molar ratio is from 0.00035 to 0.007, alternatively from 0.00038 to 0.0061. In some embodiments the $H_2/C_2$ molar ratio used to make the HMW PE constituent is from 0.00035 to 0.00044, alternatively from 0.00037 to 0.00042; and the $H_2/C_2$ molar ratio used to make the LMW PE constituent is from 0.0009 to 0.007, alternatively from 0.0011 to 0.0061. The concentration of ICA, when used, may be from 1 to 20 mole percent (mol %), alternatively from 4 to 12 mol %, alternatively from 5.1 to 10.2 mol %, based on total moles of ethylene, any 1-alkene, and ICA in the reactor. Optionally, each FB-GPP reactor independently may be free of 1-alkene comonomers (i.e., a 1-alkene-to-ethylene ($C_X/C_2$) molar ratio=0.0000), alternatively may receive a feed of one or more 1-alkene comonomers characterized by a 1-alkene-to-ethylene ($C_X/C_2$) molar ratio of from 0.0001 to 0.10. The average residence times of the HMW PE component in the first reactor and the LMW PE constituent in the second reactor independently may be from 2 to 5 hours.

Control individual flow rates of ethylene ("$C_2$"), any 1-alkene ("$C_X$", e.g., 1-hexene or "$C_6$" or "$C_X$" wherein x is 6) to maintain a fixed comonomer to ethylene monomer gas molar ratio ($C_X/C_2$, e.g., $C_6/C_2$) equal to a described value, and flow rate of any hydrogen ("$H_2$") to keep a constant hydrogen to ethylene gas molar ratio ("$H_2/C_2$") equal to a described value, and a constant ethylene ("$C_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described reactor bed temperature RBT. Maintain the fluidized bed at a constant height by withdrawing a portion of the bed at a rate equal to the rate of production of particulate form of the bimodal PE-based composition, which production rate may be from 10 to 20 kilograms per hour (kg/hr), alternatively 13 to 18 kg/hr. Remove the produced bimodal PE-based composition semi-continuously via a series of valves into a fixed volume chamber, and purge the removed composition with a stream of humidified nitrogen ($N_2$) gas to remove entrained hydrocarbons and deactivate any trace quantities of residual catalysts.

The ICA may be fed separately into the FB-GPP reactor or as part of a mixture also containing the catalyst system. The ICA may be a ($C_{11}$-$C_{20}$)alkane, alternatively a ($C_5$-$C_{10}$) alkane, alternatively a ($C_5$)alkane, e.g., pentane or 2-methylbutane; a hexane; a heptane; an octane; a nonane; a decane; or a combination of any two or more thereof. The aspects of the polymerization method that use the ICA may be referred to as being an induced condensing mode operation (ICMO). ICMO is described in U.S. Pat. Nos. 4,453,399; 4,588,790; 4,994,534; 5,352,749; 5,462,999; and 6,489,408. The concentration of ICA in the reactor is measured indirectly as total concentration of vented ICA in recycle line using gas chromatography by calibrating peak area percent to mole percent (mol %) with a gas mixture standard of known concentrations of ad rem gas phase constituents.

Monitor compositions of gases being fed into the FB-GPP reactor by an in-line gas chromatograph in the cycle loop in order to maintain specific concentrations thereof that define and enable control of polymer properties.

The polymerization conditions may further include one or more additives such as a chain transfer agent or a promoter or a continuity additive. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppmw based on all feeds into reactor) of a static control agent and/or a continuity additive such as aluminum stearate or polyethyleneimine or a mixture of aluminum stearate and an ethoxylated amine (e.g., continuity additive CA-300). The static control agent may be used to inhibit formation or buildup of static charge in the reactor.

Gas phase polymerization reactors and methods are generally well-known in the art. For example, the FB-GPP reactor/method may be as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. FB-GPP and stirred-bed gas phase polymerization reactor (SB-GPP reactor) polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421. The FB-GPP reactor may be a commercial scale reactor such as a UNIPOL™ reactor, which is available from Univation Technologies, LLC, a subsidiary of The Dow Chemical Company, Midland, Michigan, USA. Alternatively, two UNIPOL™ reactors in series.

A suitable pilot plant-scale, fluidized bed, gas-phase polymerization reactor ("Pilot FB-GPP Reactor") has a reaction zone dimensioned as 300 to 460 mm (12 to 17 inches) internal diameter and a 1.8 to 3.4 meter (6 to 11 feet) in straight-side height and containing a fluidized bed of granules of polyethylene resin. The Pilot FB-GPP Reactor comprises a reactor vessel containing a fluidized bed of a polyethylene powder, a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot FB-GPP Reactor further comprises a compressor blower of sufficient power to continuously cycle or loop gas around from out of the gas outlet in the expanded section in the top of the reactor vessel down to and into the bottom gas inlet of the Pilot FB-GPP Reactor and through the distributor plate and fluidized bed. The Pilot FB-GPP Reactor further comprises a cooling system to remove heat of polymerization and maintain the fluidized bed at a target temperature. There is a recycle gas line for flowing a recycle gas stream and gas feed inlets and polymer product outlet. Introduce gaseous feed streams of ethylene and hydrogen together with any 1-alkene comonomer below the reactor bed into the recycle gas line. Measure the gas composition (e.g., ethylene, any comonomer, $H_2$, and $N_2$) total concentration in the gas/vapor effluent by sampling the gas/vapor effluent in the recycle gas line. Return the gas/vapor effluent (other than a small portion removed for sampling) to the reactor via the recycle gas line.

The polyethylene blend is combined with the nucleating agent to give the bimodal PE-based composition according to the method described herein. The polyethylene blend is advantageously designed in such a way that a film of the bimodal PE-based composition comprising the polyethylene blend and the nucleating agent has decreased water vapor transition rate (WVTR) and decreased haze relative to WVTR and haze, respectively, of a comparative film of equal thickness and made from the polyethylene without the nucleating agent. As used herein, the term "nucleating agent" means any additive that has the dual decreasing effects on WVTR and haze when combined with the polyethylene blend. Examples of suitable nucleating agents may include the so-called "high performance nucleating agent" and "high performance organic nucleating agent" mentioned in U.S. Pat. No. 9,644,087 B2 column 5, line 50, to column 6, line 50; and the US patents cited therein. Thus, the present nucleating agent may be a modifying agent of U.S. Pat. No. 5,981,636 or a metal salt thereof; a bicyclo[2.2.1]heptane dicarboxylate salt of U.S. Pat. No. 6,465,551 B1; a salt of a cyclic dicarboxylic acid having a hexahydrophthalic acid of Formula (I) of claim 1 of U.S. Pat. No. 6,599,971 B2; or a metal salt of a phosphate ester of U.S. Pat. No. 5,342,868 (e.g., products NA-11 and NA-21 by Asahi Denka). The nucleating agent may have a molecular weight of less than 1,000 grams per mole.

In some embodiments the nucleating agent comprises a Group 2 or Group 12 metal 1,2-dicarboxylate salt, wherein the 1,2-dicarboxylate salt is a dianion of formula (I): —OOC—CH($R^2$)—CH($R^3$)—COO— (I), wherein $R^2$ and $R^3$ are independently H or a ($C_1$ to $C_4$)alkyl or $R^2$ and $R^3$ are bonded to each other (in addition to being bonded to their respective CH carbon atom shown in formula (I)) to give a ($C_3$ to $C_4$)alkylene; and wherein the Group 2 metal is magnesium or calcium; and wherein the Group 12 metal is zinc. In other embodiments the nucleating agent comprises a monobasic aluminum 1,2-dicarboxylate salt that is the dianion of formula (I). In some aspects the nucleating agent comprises the Group 2 metal 1,2-dicarboxylate salt; alternatively, the Group 12 metal 1,2-dicarboxylate salt. In some aspects $R^2$ and $R^3$ are bonded to each other to give a ($C_4$)alkylene, or the Group 2 metal is calcium, or $R^2$ and $R^3$ are bonded to each other to give a ($C_4$)alkylene and the Group 2 metal is calcium. Each ($C_3$ to $C_4$)alkylene may be unsubstituted or substituted with one or more unsubstituted ($C_1$-$C_4$)alkyl groups. The molar ratio of moles of the Group 2 or Group 12 metal to moles of the 1,2-dicarboxylate salt is 1:1, which may be indicated in parenthesis after a chemical name of a species of the Group 2 metal 1,2-dicarboxylate salt. The Group 2 metal 1,2-dicarboxylate salt of formula (I) wherein $R^2$ and $R^3$ are bonded to each other to give a ($C_4$)alkylene, wherein the ($C_4$)alkylene is a diradical of formula $CH_2CH_2CH_2CH_2$, and the Group 2 metal is calcium is called calcium cyclohexane-1,2-dicarboxylate (1:1) and has CAS number 491589-22-1. In some aspects the calcium cyclohexane-1,2-dicarboxylate (1:1) is calcium (1R,2S)-cis-cyclohexane-1,2-dicarboxylate (1:1). In some aspects the nucleating agent is calcium cyclohexane-1,2-dicarboxylate (1:1), magnesium cyclohexane-1,2-dicarboxylate salt (1:1), or zinc cyclohexane-1,2-dicarboxylate salt (1:1).

The total amount of the nucleating agent in the bimodal PE-based composition may be from 65 to 1,100 parts per million weight (ppmw), alternatively from 155 to 1,040 ppmw, alternatively from 155 to 840 ppmw, alternatively at least 480 ppmw, alternatively from 480 to 814 ppmw, based on weight of the nucleating agent relative to the combined weight of the HMW PE constituent and the LMW PE constituent.

The bimodal PE-based composition may further comprise the at least one additive in addition to the nucleating agent. The at least one additive is different than the HMW and LMW PE constituents and the nucleating agent. The at least one additive may be one or more of a Group 2 or 12 metal-bis(monocarboxylate) salt, a different polyethylene homopolymer; a different unimodal ethylene/alpha-olefin composition; a different bimodal ethylene/alpha-olefin composition; a polypropylene polymer; an antioxidant (e.g., Antioxidant 1 and/or 2 described later); an acid neutralizer (e.g., hydrotalcite or a metal deactivator); an anti-block (e.g., talc); an inorganic filler (e.g., hydrophobic fumed silica, which is made by surface treating a hydrophilic fumed silica with a hydrophobic agent such as dimethyldichlorosilane); a colorant (e.g., carbon black or titanium dioxide); a stabilizer for stabilizing the formulation against effects of ultraviolet light (UV stabilizer), such as a hindered amine stabilizer (HAS), such as a hindered amine light stabilizer (HALS); a processing aid; a slip agent (e.g., erucamide, stearamide, or behenamide); and a flame retardant. The formulation may be made by melt-blending together the bimodal polyethylene-based composition and the at least one additive. The amount of any polymer additive is not sufficient to negate the beneficial WVTR and haze benefits of the composition. The silica may be used in an amount that is effective to provide a reduced level of dusting in films formed from the polyethylene-based compositions. The effective amount of silica may be from 75 to 800 ppmw, alternatively from 100 to 500 ppmw, based on the total weight of the bimodal PE-based composition. The silica may be Sylobloc 45, from Grace Davison Company.

The bimodal PE-based composition may further comprise the Group 2 or 12 metal-bis(monocarboxylate) salt. In making the bimodal PE-based composition, the nucleating agent and the Group 2 or 12 metal-bis(monocarboxylate) salt may be provided to the polyethylene blend in the form of a nucleating agent formulation comprising the nucleating agent and the Group 2 or 12 metal-bis(monocarboxylate) salt. Alternatively, the nucleating agent and the Group 2 or 12 metal-bis(monocarboxylate) salt may be provided separately to the polyethylene blend.

In the Group 2 or 12 metal-bis(monocarboxylate) salt each monocarboxylate independently may be a monoanion of formula $R^1COO—$, wherein $R^1$ is a ($C_8$ to $C_{20}$)alkyl group and wherein the Group 2 metal is magnesium or calcium and the Group 12 metal is zinc. The Group 2 or 12 metal-bis (monocarboxylate) salt may also be called a Group 2 or 12 hemi-metal monocarboxylate salt. The molar ratio of moles of the Group 2 or 12 metal to moles of the monocarboxylate salt is 1:2, which may be indicated in parenthesis after a chemical name of a species of the Group 2 or 12 metal bis(monocarboxylate) salt. In some aspects the Group 2 or 12 metal-bis(monocarboxylate) salt is calcium stearate (1:2), calcium palmitate (1:2), zinc palmitate (1:2), zinc stearate (1:2), or a combination of any two or more thereof. Prior to being added to the HMW PE and LMW PE constituents used to make the bimodal PE-based composition, the nucleating agent may be combined with at least one the Group 2 or 12 metal-bis(monocarboxylate) salt to give a combination of the nucleating agent and the at least one Group 2 or 12 metal-bis(monocarboxylate) salt, and the combination may then be blended into the HMW PE and LMW PE constituents to give the embodiment of the bimodal PE-based composition that further comprises the Group 2 or 12 metal-bis(monocarboxylate) salt.

In making the bimodal PE-based composition, the nucleating agent, the nucleating agent formulation, and/or the at least one additive may be provided to the polyethylene blend in the form of a masterbatch. The masterbatch comprises the nucleating agent and/or the at least one additive dispersed in a polyethylene carrier resin. The melt index ($I_2$) of the polyethylene carrier resin is not particularly limited. In some aspects the polyethylene carrier resin has a melt index ($I_2$) of 4 to 12 g/10 minutes. In such embodiments, the bimodal PE-based composition further comprises the carrier resin. An example of the polyethylene carrier resin is a polyethylene homopolymer having a density of 0.965 g/cm3 and a melt index ($I_2$) of 8 to 9 g/10 minutes. The masterbatch may comprise from 2 to 40 or more weight parts, alternatively from 2 to 4 weight parts of the nucleating agent per 100 weight parts of the carrier resin. The masterbatch may comprise the carrier resin, the nucleating agent or nucleating agent formulation, and the at least one additive such as silica, such as Sylobloc 45, and/or a neutralizer, such as hydrotalcite. Use of the masterbatch may beneficially enable easier or wider dispersion of the nucleating agent in the polyethylene blend. Use of varying amounts of the masterbatch may allow for readily making embodiments of the bimodal PE-based composition that contain a variety of loadings (amounts) of the nucleating agent (see the Examples) and/or the at least one additive.

The bimodal PE-based composition and the polyethylene blend may be free of a polyethylene polymer made with any one of catalysts (i) to (xiii): (i) a Ziegler-Natta catalyst; (ii) a chromium-based catalyst; (iii) a non-metallocene catalyst, such as a bis((alkyl-substituted phenylamido)ethyl)amine $MX_2$; (iv) a zirconocene or titanocene catalyst; (v) a hafnocene catalyst that is not made from a bis(n-propylcyclopentadienyl)hafnium $X_2$; (vi) both (i) and (ii); (vii) both (i) and (iii); (viii) both (i) and (iv); (ix) both (i) and (v); (x) both (ii) and (iii); (xi) both (ii) and (iv); (xii) both (ii) and (v); (xiii) each of (i) to (v).

Additive. A compound or material that may be included in the bimodal PE-based composition to modify a property thereof, with the proviso that the compound or material is not the HMW and LMW PE constituents of the polyethylene blend, a polyolefin (e.g., the polyethylene carrier resin), or the nucleating agent.

Copolymer. A polymer derived from two or more species of monomer. The copolymer may be a bipolymer derived from two species of monomer (e.g., ethylene and 1-hexene), a terpolymer derived from three species of monomer (e.g., ethylene, 1-butene, and 1-hexene), a quarterpolymer derived from four species of monomer, etc.

Film. A manufactured article that is restricted in one dimension.

High density. As applied to a polyethylene, having a density of greater than or equal to 0.935 g/cm³, alternatively from 0.940 to 0.970 g/cm³, measured according to ASTM D792-08 (Method B, 2-propanol). The HMW PE constituent and the LMW PE constituent independently may be a high-density polyethylene (HDPE).

Homopolymer. A polymer derived from one species of monomer. The species may be real (e.g., ethylene or a 1-alkene), implicit (e.g., as in poly(ethylene terephthalate)), or hypothetical (e.g., as in poly(vinyl alcohol)).

Metallocene catalyst. Homogeneous or heterogeneous material that contains a cyclopentadienyl ligand-metal complex and enhances olefin polymerization reaction rates.

Single-site catalyst. An organic ligand-metal complex useful for enhancing rates of polymerization of olefin monomers and having at most two discrete binding sites at the metal available for coordinating to monomer prior to insertion on a propagating polymer chain.

Non-metallocene catalyst. A single-site catalyst that is free of an unsubstituted or substituted cyclopentadienyl ligand.

Ziegler-Natta catalysts. Heterogeneous materials that enhance olefin polymerization reaction rates and are prepared by contacting inorganic titanium compounds, such as titanium halides supported on a magnesium chloride support, with an activator.

The relative terms "higher" and "lower" in HMW PE constituent and LMW PE constituent are used in reference to each other and merely mean that the weight-average molecular weight of the HMW PE constituent ($M_W$-HMW) is greater than the weight-average molecular weight of the LMW PE constituent ($M_W$-LMW), i.e., $M_W$-HMW>$M_W$-LMW.

Any compound, composition, formulation, mixture, or product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, TI, Pb, Bi, lanthanoids, and actinoids; with the proviso that any required chemical elements (e.g., C and H required by a polyolefin; or C, H, and O required by an alcohol) are not excluded.

Alternatively precedes a distinct embodiment. Aspect means an embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. ISO is International Organization for Standardization, Chemin de Blandonnet 8, CP 401-1214 Vernier, Geneva, Switzerland. Terms used herein have their IUPAC meanings unless defined otherwise. For example, see IUPAC's *Compendium of Chemical Terminology. Gold Book*, version 2.3.3, Feb. 24, 2014. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values.

Complex Viscosity Test Method: measure complex viscosity, loss modulus, storage modulus, and phase angle via a frequency sweep from 0.1 to 100 radians per second (rad/s) at 10% strain on 25-mm diameter "puck" at 190° C. in an inert gas ($N_2$) environment. Control temperature using a convection oven. Prepare the puck by compression molding pellets of test sample into 2-mm thick plaques, and punch out there from a 25-mm diameter "puck". Use an ARES-G2 or ARES-2 rheometer from TA Instruments equipped with top and bottom 25-mm parallel plates having an initial gap therebetween set to about 1.8 mm. Place the puck on the bottom plate, and allow the puck to reach thermal equilibrium. Then close the gap, and trim the puck to remove excess material before measuring the complex viscosity.

Density is measured according to ASTM D792-08, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter ($g/cm^3$).

For property measurements, samples are prepared into test specimens, plaques, or sheets according to ASTM D4703-10, *Standard Practice for Compression Molding Thermoplastic Materials into Test Specimens, Plaques, or Sheets*.

The bimodal PE-based composition and the polyethylene blend may be characterized by a bimodal molecular weight distribution (bimodal MWD) as determined by gel permeation chromatography (GPC). The bimodal MWD may be characterized as two peaks in a plot of dW/dLog(MW) on the y-axis versus Log(MW) on the x-axis to give a Gel Permeation Chromatograph (GPC) chromatogram, wherein Log(MW) and dW/dLog(MW) are as defined herein and are measured by the GPC Test Method described later. The two peaks may be separated by a distinguishable local minimum therebetween or one peak may merely be a shoulder on the other, or both peaks may partly overlap so as to appear is a single GPC peak.

Gel permeation chromatography (GPC) Test Method (conventional GPC): Use a PolymerChar GPC-IR (Valencia, Spain) high temperature GPC chromatograph equipped with an internal IR5 infra-red detector (IR5, measurement channel). Set temperatures of the autosampler oven compartment at 160° C. and column compartment at 150° C. Use a column set of four Agilent "Mixed A" 30 cm 20-micron linear mixed-bed columns; solvent is 1,2,4 trichlorobenzene (TCB) that contains 200 ppmw of butylated hydroxytoluene (BHT) sparged with nitrogen. Injection volume is 200 microliters. Set flow rate to 1.0 milliliter/minute. Calibrate the column set with at least 20 narrow molecular weight distribution polystyrene (PS) standards (Agilent Technologies) arranged in six "cocktail" mixtures with approximately a decade of separation between individual molecular weights with molecular weights ranging from 580 to 8,400,000 in each vial. Convert the PS standard peak molecular weights to polyethylene molecular weights using the method described in Williams and Ward, J. Polym. Sci., Polym. Let., 6, 621 (1968) and equation 1: ($M_{polyethylene}$=A× ($M_{polystyrene}$)B (EQ1), wherein $M_{polyethylene}$ is molecular weight of polyethylene, $M_{polystyrene}$ is molecular weight of polystyrene, A=0.4315, × indicates multiplication, and B=1.0; where MPE=MPS×Q, where Q ranges between 0.39 to 0.44 to correct for column resolution and band-broadening effects) based on a linear homopolymer polyethylene molecular weight standard of approximately 120,000 and a polydispersity of approximately 3, which is measured independently by light scattering for absolute molecular weight. Dissolve samples at 2 mg/mL in TCB solvent at 160° C. for 2 hours under low-speed shaking. Generate a baseline-subtracted infra-red (IR) chromatogram at each equally-spaced data collection point (i), and obtain polyethylene equivalent molecular weight from a narrow standard calibration curve for each point (i) from EQ1. Calculate number-average molecular weight ($M_n$ or $M_{n(GPC)}$), weight-average molecular weight ($M_W$ or $M_{W(GPC)}$), and z-average molecular weight ($M_Z$ or $M_{Z(GPC)}$) based on GPC results using the internal IR5 detector (measurement channel) with PolymerChar GPCOne™ software and equations 2 to 4, respectively:

equation 2

$$MN_{(GPC)} = \frac{\sum_{i} IR_i}{\sum_{i}(IR_i/M_{polyethylene_i})};$$  (EQ2)

equation 3

$$Mw_{(GPC)} = \frac{\sum_{i}(IR_i * M_{polyethylene_i})}{\sum_{i} IR_i};$$  (EQ3)

and equation 4

$$Mz_{(GPC)} = \frac{\sum_{i}(IR_i * M_{polyethylene_i}^2)}{\sum_{i}(IR_i * M_{polyethylene_i})}.$$  (EQ4)

Monitor effective flow rate over time using decane as a nominal flow rate marker during sample runs. Look for deviations from the nominal decane flow rate obtained during narrow standards calibration runs. If necessary, adjust the effective flow rate of decane so as to stay within ±2% of the nominal flow rate of decane as calculated according to equation 5: Flow rate(effective)=Flow rate(nominal)* ($RV_{(FM\ Calculated)}/RV_{(FM\ Sample)}$ (EQ5), wherein Flow rate (effective) is the effective flow rate of decane, Flowrate (nominal) is the nominal flow rate of decane, $RV_{(FM\ Calibrated)}$ is retention volume of flow rate marker decane calculated for column calibration run using narrow standards, $RV_{(FM\ Sample)}$ is retention volume of flow rate marker decane calculated from sample run, * indicates mathematical multiplication, and/indicates mathematical division. Discard any molecular weight data from a sample run with a decane flow rate deviation more than ±2%.

Split (the wt % amount of the HMW PE constituent relative to the wt % amount of the LMW PE constituent based on total weight (100.0 wt %) of the bimodal PE-based composition is determined from the relative production rates of the first FB-GPP reactor making the HMW PE constituent relative to the production rate of the second FB-GPP reactor making the LMW PE constituent. For example, if the production rate of the first FB-GPP reactor making the HMW PE constituent is 10.0 kilograms per hour (kg/hour) and the production rate of the second FB-GPP reactor making the LMW PE constituent is 9.00 kg/hour, the split is 52.6 wt % (100*(10.0/19.0)) of the HMW PE constituent and 47.4 wt % (100*(9.0/19.0)) of the LMW PE constituent.

Test Film Preparation Method: see examples below. Prior to testing, the film was conditioned for at least 40 hours (after film production) at 23°±2° C. and 50%±10% relative humidity.

Haze Test Method: Total haze was measured according to ASTM D1003-07, *Standard Test Method for Haze and Luminous Transmittance of Transparent Plastics*, using a Hazegard Plus haze meter (BYK-Gardner USA; Columbia, Maryland, USA). Sample dimensions 15 cm×15 cm (6 inches by 6 inches) and a thickness of about 50 μm. Reported result as the average of measurements of five separate film samples. The actual haze measured by this method may then be normalized to allow comparisons of haze values for film samples having different thicknesses using the following equation: normalized haze (to thickness of 50.8 μm)=(actual haze)*a film thickness ratio of 50.8 μm (2.00 mils)/(actual film thickness value), wherein * means multiplication and/ means division. Thus, the normalized haze is actual haze normalized to a film having a thickness of 50.8 μm. If the actual film thickness is greater than 50.8 μm, then its normalized haze will be less than its actual haze. For example, if actual film thickness is 56.0 μm and actual haze is 20.0%, then normalized haze=20.0%*(50.8 μm/56.0 μm) 18.1%, which is the haze that would have been expected if the actual film thickness had been 50.8 μm instead of 56.0 μm. If the actual film thickness is 50.8 μm, then the normalized haze equals actual haze. If the actual film thickness is less than 50.8 μm, then the normalized haze will be greater than the actual haze.

High Load Melt Index (HLMI) $I_{21}$ Test Method: use ASTM D1238-10, *Standard Test Method for Melt Flow Rates of Thermoplastics by Extrusion Platometer*, using conditions of 190° C./21.6 kilograms (kg). Report results in units of grams eluted per 10 minutes (g/10 min.).

Melt Index ("$I_2$") Test Method: for ethylene-based (co)polymer is measured according to ASTM D1238-10, using conditions of 190° C./2.16 kg, formerly known as "Condition E".

Melt Index ("$I_5$") Test Method: for ethylene-based (co)polymer is measured according to ASTM D1238-10, using conditions of 190° C./5.0 kg, formerly known as "Condition E".

Melt Flow Ratio MFR2: ("$I_{21}/I_2$") Test Method: calculated by dividing the value from the HLMI $I_{21}$ Test Method by the value from the Melt Index $I_2$ Test Method.

Water Vapor Transmission Rate (WVTR) Test Method: measured with a Mocon W3/33 instrument according to ASTM F1249-06 at 38° C., 100% relative humidity, on a film having a thickness of about 50 micrometers (μm). WVTR units are commonly expressed in the art as 0.25 gram-mil/100 square inches-day or 0.25 gram-mil/100 in²-day. 0.25 gram-mil/100 in²-day=0.25 (grams*25.4 micrometers)/(0.0645 square meter*day).

EXAMPLES

Additional inventive embodiments are included herein based on the preceding aspects, and/or the claims described later, that describe a range for a process condition and/or a range for a material property, wherein in the additional inventive embodiments an endpoint of the process condition range and/or an endpoint of the material property range, respectively, is amended to any one exemplified process condition value and/or any one exemplified material property value, respectively, described below in this section for any one inventive example.

Carrier Resin 1: a polyethylene having a density of 0.965 and a melt index ($I_2$) of 8.2 g/10 min. Available from The Dow Chemical Company as DMDA-8007.

Antioxidant: 1. Pentaerythritol tetrakis(3-(3,5-di(1',1'-dimethylethyl)-4-hydroxyphenyl)propionate), having chemical name pentaerythritol tetrakis(3-(3,5-di-tert-butyl-4-hydroxyphenyl)propionate); obtained as IRGANOX 1010 from BASF.

Antioxidant 2. Tris(2,4-di(1',1'-dimethylethyl)-phenyl) phosphite. Obtained as IRGAFOS 168 from BASF.

Antioxidant 3. Octadecyl-3-(3,5-di-tert-butyl-4-hydroxyphenyl)propionate. Obtained as IRGANOX 1076 from BASF.

Catalyst: bis(n-propylcyclopentadienyl)hafnium dimethyl. CAS no. 255885-01-9. May be made according to Example 7 of U.S. Pat. No. 6,175,027 B1 except wherein $HfCl_4$ is used in place of $ZrCl_4$ to give bis(n-propylcyclopentadienyl)hafnium dichloride, and then reacting same with methylmagnesium chloride to give bis(n-propylcyclopentadienyl)hafnium dimethyl. May be obtained from BOC Sciences, a brand of BOCSCI Inc., Shirley, New York, USA.

Continuity Additive: CA-300 from Univation Technologies, LLC, Houston, Texas, USA.

Activator: methylaluminoxane (MAO).

Ethylene ("$C_2$"): $CH_2=CH_2$.

ICA: a mixture consisting essentially of at least 95%, alternatively at least 98% of 2-methylbutane (isopentane, $CH_3(CH_2)_2CH(CH_3)_2$) and minor constituents that at least include pentane ($CH_3(CH_2)_3CH_3$).

Molecular hydrogen gas: $H_2$.

Mineral oil: Sonneborn HYDROBRITE 380 PO White.

Nucleating Agent Formulation 1: comprises about 65 wt % of nucleating agent 1, calcium cyclohexane-1,2-dicarboxylate salt ("NA1") and about 35 wt % of a combination of zinc stearate and zinc palmitate. Available as HYPERFORM HPN20E from Milliken & Company, USA.

Nucleating agent masterbatch 1: melt-compound 90.5 weight parts of Carrier Resin 1, 5.0 weight parts of Nucleating Agent Formulation 1, 3 weight parts of a silica powder dispersing aid (Sylobloc 45), and 0.5 weight parts of a neutralizer hydrotalcite using a ZSK twin-screw extruder to give nucleating agent masterbatch 1.

Preparation of Spray-Dried Catalyst System 1 (sd-Cat-1): bis(propylcyclopentadienyl)hafnium dimethyl spray-dried on silica. Prepared sd-Cat-1 as a dry powder of according to U.S. Pat. No. 8,497,330 B2, column 22, lines 48, to 67. Alternatively the sd-Cat-1 may be prepared as follows: Use a Büchi B-290 mini spray-drier contained in a nitrogen atmosphere glovebox. Set the spray drier temperature at 165° C. and the outlet temperature at 60° to 70° C. Mix fumed silica (Cabosil TS-610, 3.2 g), MAO in toluene (10 wt %, 21 g), and bis(propylcyclopentadienyl)hafnium dimethyl (0.11 g) in toluene (72 g). Introduce the resulting mixture into an atomizing device, producing droplets that are then contacted with a hot nitrogen gas stream to evaporate the liquid therefrom, thereby making a powder. Separate the powder from the gas mixture in a cyclone separator, and collect the sd-Cat-1 as a powder (3.81 g) in a cone can. The sd-Cat-1 may be fed to a gas phase polymerization reactor as a dry powder or as a slurry in mineral oil.

Overall properties of the polyethylene blend and the bimodal PE-based composition are measured directly thereon, respectively.

Properties of the HMW PE constituent are measured directly on a sample of granular resin of the HMW PE constituent that is made in a first FB-GPP reactor before the HMW PE constituent is transferred into a second FB-GPP reactor, in which the LMW PE constituent is made. The granular resin is stabilized with 2000 ppmw of butylated hydroxytoluene (BHT) prior to such property measurements.

Low Molecular Weight Polyethylene (LMW PE) Property Determination Model: Properties of the LMW PE constituent are based on a correlation curve (plot) that is generated by performing single reactor polymerization experiments at various reactor conditions, i.e., temperature and $H_2/C_2$ molar ratios, used in the second FB-GPP reactor correlated to the correlation curve generated by measured density and melt index values of reference LMW PE resins made in separate single-reactor reference runs. The density of the reference LMW PE resin is measured according to ASTM D792-08 (Method B, 2-propanol). The melt index ($I_2$) of the reference LMW PE resin is measured according to ASTM D1238-10 (190° C., 21.6 kg). The reference runs comprise operating a FB-GPP reactor over a range or operating conditions that result in LMW PE resins having different densities and melt index values, and developing a model of the reactor operating conditions versus melt index and density values that is then used to determine the density and melt index from the actual reactor operating conditions used to make the LMW PE constituent. Only interpolated property values are reported for the inventive LMW PE constituents from the correlation curve of this model. To be conservative, when the model's correlation curve yields extrapolated data, these are not reported; instead "OBM" (out of boundaries of model) is listed. The model is based on a full data set of all reference runs, except with the proviso that when an inventive example is made using the same $H_2/C_2$ molar ratio and bed temperature conditions as those used in a particular one of the reference runs, it is the data from that particular reference run that are reported for that inventive example. The FB-GPP reactor operating conditions for reference runs used to estimate from the model the properties of the LMW PE constituent of polyethylene blends PEB1 to PEB4 (described later) are described below and shown in Table 1. Because the same $H_2/C_2$ molar ratio and bed temperature conditions are used for both Reference LMW PE Constituent 1 and PEB5, the density and melt index ($I_2$) reported for PEB5 are those of Reference LMW PE Constituent 1.

Reference preparations of LMW PE resins used to generate the LMW PE Property Determination Model are made in a separate FB-GPP reactor reference runs: each LMW PE resin is an ethylene-based resin produced using the spray-dried catalyst system prepared as described above in Preparation of sd-Cat-1. Feed the sd-Cat-1 as a dry powder to a fluidized-bed gas phase polymerization single reactor system comprising a Pilot FB-GPP Reactor (reactor) comprising a bed of polyethylene granules. Polymerize ethylene ($C_2$) in the reactor after reaching equilibrium. Initiate the polymerization by continuously feeding the dry sd-Cat-1 catalyst powder, ethylene, and hydrogen ($H_2$) into the fluidized bed of polyethylene. Inert gases, nitrogen and isopentane, make up the remaining gas composition in the reactor. Reactor conditions are reported below in Table 1. Make the reference LMW PE resins as granular resins, stabilize the granular resin with 2000 ppmw of butylated hydroxytoluene (BHT) prior to measurements, and measure the density and melt index properties directly. Use the measurements to estimate the density and melt index properties of the respective reference LMW PE constituents 1 and 2 of the later-described polyethylene blends PEB1 and PEB2, respectively.

TABLE 1

Polymerization Conditions for LMW PE Property Determination Model.

| Reactor Operating Conditions | Making Reference LMW PE constituent 1 | Making Reference LMW PE constituent 2 |
|---|---|---|
| Temperature (° C.) | 85 | 85 |
| Pressure (kPa) | 2400 | 2399 |
| $C_2$ Partial Pressure (kPa) | 1514 | 1516 |
| $H_2/C_2$ Molar Ratio | 0.0050 | 0.0010 |
| $C_x/C_2$ Molar Ratio | 0.0000 | 0.0000 |
| Isopentane (mol %) | 8.0 | 8.0 |
| Sd-Cat-1 feed rate (g/hour) | 1.6 | 1.9 |
| Production Rate (kg/hour) | 10.5 | 15.9 |
| Bed Weight (kg) | 75.6 | 76.4 |

| LMW PE Constituent Properties | Reference LMW PE constituent 1 | Reference LMW PE constituent 2 |
|---|---|---|
| Density (g/cm³) | 0.9701 | 0.9604 |
| Melt index ($I_2$) (g/10 min.) | 1320 | 7.3 |

Preparation of inventive polyethylene blends 1 and 2 (PEB1 and PEB2) and comparative polyethylene blends of Comparative Examples 1 and 2 (CE1 and CE2): use the spray-dried catalyst system prepared as described above in Preparation of sd-Cat-1. Feed the sd-Cat-1 as a dry powder to a fluidized-bed gas phase polymerization dual reactor system comprising two Pilot FB-GPP Reactors (first reactor and second reactor) comprising beds of polyethylene granules. After reaching equilibrium in the first reactor, polymerize ethylene ($C_2$) in the absence of 1-alkene ($C_X$). Initiate polymerization in the first reactor by continuously feeding the dry sd-Cat-1 catalyst powder, ethylene, and hydrogen ($H_2$) into the fluidized bed of polyethylene granules, while also feeding continuity additive CA-300 as a 20 wt % solution in mineral oil at a feed rate of 2.5 milliliters per hour (mL/hour). From the first reactor withdraw the produced HMW PE constituent as a unimodal polyethylene polymer that contains active catalyst. Transfer the withdrawn material to the second reactor using second reactor gas as a transfer medium. Feed ethylene and hydrogen into the second reactor, but do not feed fresh sd-CAT-1 into the second reactor. Inert gases, nitrogen and isopentane, make up the remaining gas composition in both the second FB-GPP reactor. Polymerization conditions for the first and second reactors are reported in Table 2. In Table 2, "HMW Rx" means the gas phase polymerization reaction that makes the HMW PE constituent in the first reactor and "LMW Rx" means the gas phase polymerization reaction that makes the LMW PE constituent in the second reactor.

TABLE 2

Polymerization Conditions Used to Make PEB1, PEB2, CE1, CE2.

| Reactor Operating Conditions | PEB1 | | PEB2 | | CE1 | | CE2 | |
|---|---|---|---|---|---|---|---|---|
| | Making HMW PE | Making LMW PE | Making HMW PE | Making LMW PE | Making HMW PE | Making LMW PE | Making HMW PE | Making LMW PE |
| Temperature (° C.) | 93 | 85 | 93 | 85 | 95 | 85 | 95 | 85 |
| Pressure (kPa) | 2398 | 2536 | 2397 | 2541 | 2397 | 2398 | 2395 | 2566 |
| $C_2$ Partial Pressure (kPa) | 663 | 1211 | 624 | 1579 | 414 | 1862 | 414 | 1806 |
| $H_2/C_2$ Molar Ratio | 0.00039 | 0.0060 | 0.00040 | 0.0012 | 0.00031 | 0.0025 | 0.00029 | 0.0120 |
| $C_x/C_2$ Molar Ratio | 0.0000 | 0.0000 | 0.0000 | 0.0000 | 0.0000 | 0.0000 | 0.0000 | 0.0000 |
| Isopentane (mol %) | 10.2 | 5.1 | 10.1 | 5.1 | 10.0 | 5.0 | 10.0 | 5.1 |
| Sd-Cat-1 feed rate (g/hour) | 2.7 | None | 3.9 | None | 6.8 | None | 5.5 | None |
| Production Rate (kg/hour) | 15.0 | 7.9 | 15.6 | 14.8 | 11.9 | 21.5 | 10.8 | 14.1 |
| Bed Weight (kg) | 45 | 58 | 47 | 56 | 39 | 59 | 45 | 75 |
| Amount (wt %, based on production rates) | 65.6 | 34.4 | 51.4 | 48.6 | 35.6 | 64.4 | 43.3 | 56.7 |

Inventive Example PEB1: consists essentially of a first inventive HMW PE constituent that is a first HMW polyethylene homopolymer and a first inventive LMW PE constituent that is a first LMW polyethylene homopolymer.

Inventive Example PEB2: consists essentially of a second inventive HMW PE constituent that is a second HMW polyethylene homopolymer and a second inventive LMW PE constituent that is a second LMW polyethylene homopolymer.

Comparative Example CE1: consists essentially of a first comparative HMW PE constituent that is a first HMW polyethylene homopolymer and a first comparative LMW PE constituent that is a first LMW polyethylene homopolymer.

Comparative Example CE2: consists essentially of a second comparative HMW PE constituent that is a second HMW polyethylene homopolymer and a second comparative LMW PE constituent that is a second LMW polyethylene homopolymer.

Preparation of inventive polyethylene blends 3, 4, and 5 (PEB3, PEB4, and PEB5). Replicate the procedure used above for making PEB1, PEB2, CE1, and CE2 except with the conditions shown below in Table 2A. In addition the procedure comprised feeding the sd-Cat-1 as a 16.4 wt % slurry of sd-Cat-1 in mineral oil and feeding a solution of 20 wt % the Continuity Additive in mineral oil into the first FB-GPP reactor making the HMW PE constituent, but was not fed into the second FB-GPP reactor making the LMW PE constituent. The feed rates are listed in Table 2A.

TABLE 2A

Polymerization Conditions Used to Make PEB3, PEB4, PEB5.

| Reactor Operating Conditions | PEB3 | | PEB4 | | PEB5 | |
|---|---|---|---|---|---|---|
| | Making HMW PE | Making LMW PE | Making HMW PE | Making LMW PE | Making HMW PE | Making LMW PE |
| Temperature (° C.) | 85 | 85 | 85 | 85 | 85 | 85 |
| Pressure (kPa) | 2404 | 2363 | 2401 | 2361 | 2404 | 2371 |
| $C_2$ Partial Pressure (kPa) | 689 | 1194 | 620 | 1221 | 689 | 1376 |
| $H_2/C_2$ Molar Ratio | 0.00036 | 0.0068 | 0.00033 | 0.0060 | 0.00027 | 0.0050 |
| $C_x/C_2$ Molar Ratio | 0.0000 | 0.0000 | 0.0000 | 0.0000 | 0.0000 | 0.0000 |
| Isopentane (mol %) | 10.0 | 5.0 | 8.5 | 4.9 | 10.0 | 5.0 |
| Sd-Cat-1 feed rate (g/hour) (slurry) | 15.3 | 0.0 | 19.6 | 0.0 | 12.8 | 0.0 |
| Continuity Add. feed rate (mL/hour) (solution) | 3.5 | 0.0 | 3.5 | 0.0 | 3.0 | 0.0 |
| Production Rate (kg/hour) | 14.3 | 7.3 | 16.3 | 9.9 | 12.4 | 5.7 |
| Bed Weight (kg) | 52 | 69 | 51 | 72 | 54 | 73 |
| Amount (wt %, based on production rates) | 66.4 | 33.6 | 62.1 | 37.9 | 68.5 | 31.5 |

Inventive Example PEB3: consists essentially of a third inventive HMW PE constituent that is a third HMW polyethylene homopolymer and a third inventive LMW PE constituent that is a third LMW polyethylene homopolymer.

Inventive Example PEB4: consists essentially of a fourth inventive HMW PE constituent that is a fourth HMW polyethylene homopolymer and a fourth inventive LMW PE constituent that is a fourth LMW polyethylene homopolymer.

Inventive Example PEB5: consists essentially of a fifth comparative HMW PE constituent that is a fifth HMW polyethylene homopolymer and a fifth comparative LMW PE constituent that is a fifth LMW polyethylene homopolymer.

Formulating inventive polyethylene blends PEB1, PEB2, PEB3, PEB4, and PEB5; and comparative polyethylene blends CE1 and CE2 with additives (not including a nucleating agent). Separately combine the blends as granules with 200 parts per million weight (ppmw) Antioxidant 1; 1,000 ppmw Antioxidant 2; and 250 ppmw Antioxidant 3. Feed the combination to a continuous mixer (LCM-100 from Kobe Steel, Ltd.), which is closed coupled to a gear pump and equipped with a melt filtration device and underwater pelletizing system to separately produce strands that are cut into pellets of stabilized polyethylene blends PEB1, PEB2, PEB3, PEB4, PEB5, CE1, and CE2, respectively. Properties of stabilized PEB1, PEB2, CE1, and CE2 are shown below in Table 3 and their HMW and LMW PE constituent amounts are shown later in Table 4. Also listed in Table 3 are properties of the HMW PE constituents, which as described earlier are measured on BHT-stabilized (2000 ppmw) samples of the granular resins directly from the first reactor. Properties of stabilized PEB3, PEB4, and PEB5 are shown below in Table 3A and their HMW and LMW PE constituent amounts are shown later in Table 4A. Also listed in Table 3A are properties of the HMW PE constituents, which as described earlier are measured on BHT-stabilized (2000 ppmw) samples of the granular resins directly from the first reactor.

TABLE 3

Properties of stabilized⁻ polyethylene blends PEB1, PEB2, CE1, CE2.

| Property | PEB1 | PEB2 | CE1 | CE2 |
|---|---|---|---|---|
| Overall Composition Density (g/cm³)⁻ | 0.9612 | 0.9581 | 0.9647 | 0.9622 |
| Overall Composition $I_2$ (g/10 min.)⁻ | 1.14 | 1.66 | 1.25 | 1.01 |
| Overall Composition $I_{21}$ (g/10 min.)⁻ | 32.0 | 41.4 | 82.6 | 99.5 |
| Overall Composition MFR2 ($I_{21}/I_2$)⁻ | 28.0 | 24.9 | 65.9 | 98.3 |
| Overall Composition $I_5$ (g/10 min.)⁻ | 0.89 | 0.92 | N/m | N/m |
| Overall Composition $M_n$ (g/mol)⁻ | 7,786 | 27,695 | 11,123 | 3,097 |
| Overall Composition $M_w$ (g/mol)⁻ | 119,532 | 116,100 | 121,857 | 130,672 |
| Overall Composition $M_z$ (g/mol)⁻ | 350,243 | 307,560 | 508,130 | 554,648 |
| Overall Composition $M_w/M_n$⁻ | 15.35 | 4.19 | 10.96 | 42.20 |
| HMW PE constituent amount (wt %) | 65.6 | 51.4 | 35.6 | 43.3 |
| LMW PE constituent amount (wt %) | 34.4 | 48.6 | 64.4 | 56.7 |
| HMW PE constituent Density (g/cm³)* | 0.9484 | 0.9483 | 0.9435 | 0.9433 |
| HMW PE constituent $I_2$ (g/10 min.)* | 0.35 | 0.35 | N/m (<0.1) | N/m (<0.1) |
| HMW PE constituent $I_{21}$ (g/10 min.)* | 5.93 | 6.13 | 1.52 | 1.53 |
| HMW PE constituent $I_{21}/I_2$ | 17 | 17 | N/m | N/m |
| HMW PE constituent $M_n$ (g/mol) | 62,321 | 58,570 | 93,367 | 89,354 |
| HMW PE constituent $M_w$ (g/mol) | 175,942 | 168,022 | 260,299 | 254,175 |
| HMW PE constituent $M_z$ (g/mol) | 378,390 | 361,120 | 569,907 | 558,452 |
| HMW PE constituent $M_w/M_n$ | 2.82 | 2.87 | 2.79 | 2.84 |
| LMW PE constituent Density (g/cm³)^ | OBM | 0.962 | 0.968 | OBM |
| LMW PE constituent $I_2$ (g/10 min.)^ | OBM | 15 | 160 | OBM |

⁻stabilized means containing Antioxidants 1 to 3.
*indicates the measurements that were done on granular resin stabilized with BHT.
N/m means not measured and (<0.1) means based on $I_{21}$ data their $I_2$ are expected to be less than 0.1 g/10 min.
^indicates estimated values derived from the LMW PE Property Determination Model.

TABLE 3A

Properties of stabilized⁻ polyethylene blends PEB3, PEB4, PEB5.

| Property | PEB3 | PEB4 | PEB5 |
|---|---|---|---|
| Overall Composition Density (g/cm³)⁻ | 0.9614 | 0.9618 | 0.9597 |
| Overall Composition $I_2$ (g/10 min.)⁻ | 2.02 | 1.75 | 0.69 |
| Overall Composition $I_{21}$ (g/10 min.)⁻ | 60.2 | 60.4 | 20.3 |
| Overall Composition MFR2 ($I_{21}/I_2$)⁻ | 29.8 | 34.5 | 29.4 |
| Overall Composition $I_5$ (g/10 min.)⁻ | 5.74 | 5.06 | 1.97 |
| Overall Composition $M_n$ (g/mol)⁻ | 4563 | 4821 | 5993 |
| Overall Composition $M_w$ (g/mol)⁻ | 101251 | 105648 | 142814 |
| Overall Composition $M_z$ (g/mol)⁻ | 345412 | 361261 | 748517 |
| Overall Composition $M_w/M_n$⁻ | 22.2 | 21.9 | 23.8 |
| HMW PE constituent amount (wt %) | 66.4 | 62.1 | 68.5 |
| LMW PE constituent amount (wt %) | 33.6 | 37.9 | 31.5 |
| HMW PE constituent Density (g/cm³)* | 0.9507 | 0.9482 | 0.9475 |
| HMW PE constituent $I_2$ (g/10 min.)* | 0.554 | 0.373 | 0.198 |
| HMW PE constituent $I_{21}$ (g/10 min.)* | 9.67 | 6.35 | 3.44 |
| HMW PE constituent $I_{21}/I_2$ | 17.5 | 17.0 | 17.4 |
| HMW PE constituent $M_n$ (g/mol) | 52506 | 61053 | 70990 |

TABLE 3A-continued

Properties of stabilized~ polyethylene blends PEB3, PEB4, PEB5.

| Property | PEB3 | PEB4 | PEB5 |
|---|---|---|---|
| HMW PE constituent $M_w$ (g/mol) | 150499 | 170124 | 213457 |
| HMW PE constituent $M_z$ (g/mol) | 321408 | 357236 | 822243 |
| HMW PE constituent $M_w/M_n$ | 2.87 | 2.79 | 3.01 |
| LMW PE constituent Density (g/cm$^3$)^ | OBM | OBM | 0.9701 |
| LMW PE constituent $I_2$ (g/10 min.)^ | OBM | OBM | 1320 |

~stabilized means containing Antioxidants 1 to 3.
*indicates the measurements that were done on granular resin stabilized with BHT.
N/m means not measured and (<0.1) means based on $I_{21}$ data their $I_2$ are expected to be less than 0.1 g/10 min.
^indicates estimated values derived from the LMW PE Property Determination Model.

Preparation of inventive and comparative bimodal PE-based compositions and films: Make inventive compositions and films and comparative films on a Labtech LF-400 blown film line. Separately dry-blend an amount of nucleating agent masterbatch 1 with different ones of the inventive polyethylene blends PEB1, PEB2, PEB3, PEB4, or PEB5, or the comparative polyethylene blends CE1 or CE2, to give masterbatch dry-blends with an initial concentration of 812 ppmw of the nucleating agent calcium cyclohexane-1,2-dicarboxylate salt (NA1). Run two gravimetric feeders (Movacolor), one with one of the 810 ppmw NA1 dry-blend and the other gravimetric feeder with nucleating agent-free polyethylene blend PEB1, PEB2, PEB3, PEB4, or PEB5, as the case may be, or comparative resin CE1 or CE2, as the case may be. Run the two feeders at different rates to let down the concentration of the NA1 (calcium cyclohexane-1,2-dicarboxylate salt) to 490 ppmw, 160 ppmw, or 65 ppmw into PEB1, PEB2, CE1, or CE2. Run the two feeders at different rates to let down the concentration of the NA1 (calcium cyclohexane-1,2-dicarboxylate salt) to 810 ppmw, 490 ppmw, or 160 ppmw into PEB3, PEB4, or PEB5. Also use the feeder feeding the nucleating agent-free polyethylene blend PEB1, PEB2, PEB3, PEB4, or PEB5 or the comparative resin CE1 or CE2 to make the formulations containing 0 ppmw NA1. Feed the resulting blends to an LTE-20 Maxi 20 twin-screw extruder (Labtech, 11-kilowatt (kW) motor, 32 length to diameter (L:D)) at 6.8 kg per hour (15 pounds/hour) or 9.1 kg per hour (20 lbs/hour), at 300 rotations per minute (rpm). Feed the resulting mixtures to a blown film die that is a standard LabTech spiral mandrel die with six spiral channels, with 5.08 cm (2 inch) diameter and 1.0 mm (40 mils) die gap. Use pressurized air to blow a film bubble at targets 2.5 blow-up ratio (BUR, defined as maximum bubble diameter divided by die diameter). Use a dual lip air ring driven by a variable speed blower for all experiments. The air temperature in the air ring is 25° C. (78° F.). Allow the frost line height (FLH) to vary. The FLH averages 18.5 cm (7.3 inches). Control film thicknesses within ±10% at 50 μm (2 mils) by adjusting the nip roller speed. Set the extruder temperature at 215° C. (420° F.) and the transfer line and die temperatures at 210° C. (410° F.). Trim the layflat to 150 mm (6 inches) wide. Wind the trimmed layflat up into two rolls. Films have a thickness of about 0.05 mm (50 μm).

Comparative bimodal PE-based Compositions 1A to 1D (CC1A to CC1D, respectively) are made with base resin CE1 and varying amounts of nucleating agent NA1 and have the formulations shown in Table 4.

Comparative bimodal PE-based Compositions 2A to 2D (CC2A to CC2D, respectively) are made with base resin CE2 and varying amounts of nucleating agent NA1 and have the formulations shown in Table 4.

Inventive bimodal PE-based Compositions 1A to 1 D (IC1A to IC1D, respectively) contain nucleating agent are made with base resin PEB1 and varying amounts of nucleating agent NA1 and have the formulations shown in Table 4.

Inventive bimodal PE-based Compositions 2A to 2D (IC2A to IC2D, respectively) are made with base resin PEB2 and varying amounts of nucleating agent NA1 and have the formulations shown in Table 4.

Inventive bimodal PE-based Compositions 3A to 30 (IC3A to 1030, respectively) are made with base resin PEB3 and varying amounts of nucleating agent NA1 and have the formulations shown in Table 4A.

Inventive bimodal PE-based Compositions 4A to 40 (IC4A to IC4C, respectively) are made with base resin PEB4 and varying amounts of nucleating agent NA1 and have the formulations shown in Table 4A.

Inventive bimodal PE-based Compositions 5A to 50 (IC5A to IC5C, respectively) are made with base resin PEB5 and varying amounts of nucleating agent NA1 and have the formulations shown in Table 4A.

TABLE 4

Composition formulations.

| Composition Example | HMW PE Amount | LMW PE Amount | NA1* (ppmw) |
|---|---|---|---|
| CE1 | 35.6 | 64.4 | 0 |
| CC1A | 35.6 | 64.4 | 65 |
| CC1B | 35.6 | 64.4 | 160 |
| CC1C | 35.6 | 64.4 | 490 |
| CC1D | 35.6 | 64.4 | 810 |
| PEB1 | 65.6 | 34.4 | 0 |
| IC1A | 65.6 | 34.4 | 65 |
| IC1B | 65.6 | 34.4 | 160 |
| IC1C | 65.6 | 34.4 | 490 |
| IC1D | 65.6 | 34.4 | 810 |
| CE2 | 43.3 | 56.7 | 0 |
| CC2A | 43.3 | 56.7 | 65 |
| CC2B | 43.3 | 56.7 | 160 |
| CC2C | 43.3 | 56.7 | 490 |
| CC2D | 43.3 | 56.7 | 810 |
| PEB2 | 51.4 | 48.6 | 0 |
| IC2A | 51.4 | 48.6 | 65 |
| ICE2B | 51.4 | 48.6 | 160 |
| IC2C | 51.4 | 48.6 | 490 |
| IC2D | 51.4 | 48.6 | 810 |

*NA1 is calcium cyclohexane-1,2-dicarboxylate salt (1:1).

TABLE 4A

Composition formulations.

| Composition Example | HMW PE Amount | LMW PE Amount | NA1* (ppmw) |
|---|---|---|---|
| PEB3 | 66.4 | 33.6 | 0 |
| IC3A | 66.4 | 33.6 | 160 |
| IC3B | 66.4 | 33.6 | 490 |
| IC3C | 66.4 | 33.6 | 810 |
| PEB4 | 62.1 | 37.9 | 0 |
| IC4A | 62.1 | 37.9 | 160 |
| ICE4B | 62.1 | 37.9 | 490 |
| IC4C | 62.1 | 37.9 | 810 |
| PEB5 | 68.5 | 31.5 | 0 |
| IC5A | 68.5 | 31.5 | 160 |
| ICE5B | 68.5 | 31.5 | 490 |
| IC5C | 68.5 | 31.5 | 810 |

Comparative Films 1 and 2 (CF1 and CF2, respectively) are made from blend CE1 or CE2, respectively, without nucleating agent. Film properties are shown in Table 5.

Comparative Films 1A to 1D (CF1A to CF1D, respectively) are made from the Comparative Compositions CC1A to CC1 D, respectively. Film properties are shown in Table 5.

Comparative Films 2A to 2D (CF2A to CF2D, respectively): are made from the Comparative Compositions CC2A to CC2D, respectively. Film properties are shown in Table 5.

Comparative Films 3 and 4 (CF3 and CF4, respectively) are made from blend PEB1 or PEB2, respectively, without nucleating agent. Film properties are shown in Table 5.

Comparative Films 5 to 7 (CF5 to CF7, respectively) are made from blend PEB3, PEB4, or PEB5, respectively, without nucleating agent. Film properties are shown in Table 5A.

Inventive Films 1A to 1D (IF1A to IF1D, respectively) are made from Inventive Compositions IC1A to IC1D. Film properties are shown in Table 5.

Inventive Films 2A to 2D (IF2A to IF2D, respectively) are made from Inventive Compositions IC2A to IC2D. Film properties are shown in Table 5.

Inventive Films 3A to 3C (IF3A to IF3C, respectively) are made from Inventive Compositions IC3A to IC3C. Film properties are shown in Table 5A.

Inventive Films 4A to 4C (IF4A to IF4C, respectively) are made from Inventive Compositions IC4A to IC4C. Film properties are shown in Table 5A.

Inventive Films 5A to 5C (IF5A to IF5C, respectively) are made from Inventive Compositions IC5A to IC5C. Film properties are shown in Table 5A.

TABLE 5

Film Properties.

| Film Example | Composition Used to Make Film | NA1* Conc. (ppmw) | WVT Rate ((grams * 25.4 micrometers)/(0.0645 $m^2$ * day))^ | Normalized Haze^ (%) (actual haze, %) |
|---|---|---|---|---|
| CF1 | CE1 | 0 | 0.29 | 64.3 (53.7) |
| CF1A | CC1A | 65 | 0.15 | 51.3 (40.5) |
| CF1B | CC1B | 160 | 0.10 | 41.4 (34.8) |
| CF1C | CC1C | 490 | 0.12 | 35.2 (30.3) |
| CF1D | CC1D | 810 | 0.13 | 33.7 (30.2) |
| CF2 | CE2 | 0 | 0.25 | 55.7 (54.3) |
| CF2A | CC2A | 65 | 0.22 | 48.2 (47.0) |
| CF2B | CC2B | 160 | 0.12 | 39.3 (37.9) |
| CF2C | CC2C | 490 | 0.10 | 34.1 (31.2) |
| CF2D | CC2D | 810 | 0.14 | 31.0 (29.3) |
| CF3 | PEB1 | 0 | 0.31 | 44.2 (41.1) |
| IF1A | IC1A | 65 | 0.16 | 32.5 (28.3) |
| IF1B | IC1B | 160 | 0.12 | 24.3 (21.9) |
| IF1C | IC1C | 490 | 0.10 | 18.8 (15.5) |
| IF1D | IC1D | 810 | 0.10 | 17.6 (14.9) |
| CF4 | PEB2 | 0 | 0.34 | 50.7 (44.4) |
| IF2A | IC2A | 65 | 0.19 | 27.0 (23.1) |
| IF2B | IC2B | 160 | 0.11 | 21.1 (18.4) |
| IF2C | IC2C | 490 | 0.11 | 15.7 (14.1) |
| IF2D | IC2D | 810 | 0.13 | 15.1 (12.9) |

*NA1 is calcium cyclohexane-1,2-dicarboxylate salt (1:1).
^Average of 5 specimens.

In Tables 5, the inventive films made from the inventive bimodal PE-based compositions have improved (decreased) WVTR and improved (decreased) haze relative to the respective nucleating agent-free polyethylene blends PEB1 and PEB2. The inventive films also have improved WVTR and haze relative to comparative films fabricated from bimodal PE resins containing the same loading of the same nucleating agent but with different polyethylene blend.

In some aspects the effective amount of the nucleating agent in the bimodal PE-based composition is at least 150 ppmw, in which aspects the examples IC1A and IF1A and/or the examples IC2A and IF2A, each having 65 ppmw of the nucleating agent in their bimodal PE-based compositions and films, respectively, may be used as comparative examples relative to examples IC1B to IC1D and IF1B to IF1D and/or to IC2B to IC2D and IF2B to IF2D, respectively. In some aspects the effective amount of the nucleating agent in the bimodal PE-based composition is at least 480 ppmw, in which aspects the examples IC1B and IF1B and/or the examples IC2B and IF2B, each having 160 ppmw of the nucleating agent in their bimodal PE-based compositions and films, respectively, may be used as comparative examples relative to examples IC1C to IC1D and IF1C to IF1D and/or to IC2C to IC2C and IF2C to IF2D, respectively.

TABLE 5A

Film Properties.

| Film Example | Composition Used to Make Film | NA1* Conc. (ppmw) | WVT Rate ((grams * 25.4 micrometers)/(0.0645 m² * day))^ | Normalized Haze^ (%) (actual Haze, %) |
|---|---|---|---|---|
| CF5 | PEB3 | 0 | 0.32 | 50.9 (58.1) |
| IF3A | IC3A | 160 | 0.11 | 21.9 (24.5) |
| IF3B | IC3B | 490 | 0.11 | 16.9 (18.6) |
| IF3C | IC3C | 810 | 0.14 | 16.3 (17.4) |
| CF6 | PEB4 | 0 | 0.28 | 55.9 (60.4) |
| IF4A | IC4A | 160 | 0.11 | 24.0 (24.9) |
| IF4B | IC4B | 490 | 0.12 | 17.2 (19.2) |
| IF4C | IC4C | 810 | 0.11 | 17.4 (18.5) |
| CF7 | PEB5 | 0 | 0.34 | 41.3 (49.7) |
| IF5A | IC5A | 160 | 0.14 | 30.7 (37.0) |
| IF5B | IC5B | 490 | 0.15 | 28.3 (32.8) |
| IF5C | IC5C | 810 | 0.17 | 26.7 (32.0) |

In Tables 5A, the inventive films made from the inventive bimodal PE-based compositions have improved (decreased) WVTR and improved (decreased) haze relative to the respective nucleating agent-free polyethylene blends PEB3, PEB4, or PEB5.

The invention claimed is:

1. A bimodal polyethylene-based composition comprising a formulated blend of a higher molecular weight polyethylene polymer constituent (HMW PE constituent), a lower molecular weight polyethylene polymer constituent (LMW PE constituent), and an effective amount of at least 65 parts per million weight (ppmw) of a nucleating agent; wherein the HMW PE constituent has a high load melt index ($I_{21}$) from 3 to 12 g/10 min.; and the bimodal polyethylene-based composition has an overall melt index (I2) from 0.5 to 2.5 g/10 min.; an overall melt flow ratio ($I_{21}/I_2$) from 20 to 40; and an overall density from 0.935 to 0.970 gram per cubic centimeter (g/cm3), measured according to ASTM D792-08 (Method B, 2-propanol); wherein $I_2$ is measured according to ASTM D1238-10 (190° C., 2.16 kg) and $I_{21}$ is measured according to ASTM D1238-10 (190° C., 21.6 kg); and wherein each of the HMW and LMW PE constituents independently is a polyethylene homopolymer or a poly (ethylene-co-1-alkene) copolymer having from greater than 0 to 1.0 weight percent (wt %) of comonomeric content.

2. The bimodal polyethylene-based composition of claim 1 wherein the HMW PE constituent has any one of features (i) to (v): (i) a melt index ($I_2$) from 0.195 to 0.700 g/10 min.; (ii) a density from 0.940 to 0.960 g/cm3; (iii) a weight-average molecular weight (Mw) from 100,000 to 225,000 g/mol, as measured by gel permeation chromatography (GPC); (iv) a melt flow ratio ($I_{21}/I_2$) from 15 to 25; and (v) a complex viscosity from 10,000 to 100,000 pascal-seconds (Pa·s), as measured by dynamic mechanical analysis (DMA) at 0.1 radian per second (rad/s) and 190° C. using the Complex Viscosity Test Method.

3. The bimodal polyethylene-based composition of claim 1 wherein the bimodal polyethylene-based composition has any one of features (i) to (iv): (i) an amount of the HMW PE constituent of from 35 to 70 wt % and an amount of the LMW PE constituent of from 65 to 30 wt %, respectively, based on the combined weight of the HMW PE and LMW PE constituents; (ii) an overall density from 0.955 to 0.967 g/cm3; (iii) an overall high load melt index ($I_{21}$) from 18 to 85 g/10 min., measured according to ASTM D1238-10 (190° C., 21.6 kg); and (iv) an overall melt flow ratio ($I_{21}/I_2$) from 20.1 to 39.4.

4. The bimodal polyethylene-based composition of claim 1 wherein at least one, alternatively each, of the HMW PE constituent and the LMW PE constituent is a polyethylene homopolymer.

5. The bimodal polyethylene-based composition of claim 1, wherein the bimodal polyethylene-based composition has any one of features (i) to (iv): (i) the effective amount of the nucleating agent is from 150 to 1,100 weight parts per million (ppmw); (ii) the nucleating agent comprises a Group 2 or Group 12 metal 1,2-dicarboxylate salt, wherein the 1,2-dicarboxylate salt is a dianion of formula (I): —OOC—CH (R2)-CH (R3)-COO— (I), wherein R2 and R3 are independently H or a (C1 to C4) alkyl or R2 and R3 are bonded to each other to give a (C3 to C4) alkylene; and wherein the Group 2 metal is magnesium or calcium and wherein the Group 12 metal is zinc; (iii) the nucleating agent comprises calcium cyclohexane-1,2-dicarboxylate salt, magnesium cyclohexane-1,2-dicarboxylate salt, or zinc cyclohexane-1,2-dicarboxylate salt; and (iv) the bimodal polyethylene-based composition further comprises at least one of calcium stearate, zinc palmitate, and zinc stearate.

6. The bimodal polyethylene-based composition of claim 1, wherein the bimodal polyethylene-based composition has any one of features (i) to (iii): (i) a water vapor transmission rate (WVTR) of less than 0.25 (grams*25.4 micrometers)/(0.0645 square meter*day), as measured according to ASTM F1249-06 at 38° C., 100% relative humidity, on a film of the composition, the film having a thickness of about 50 micrometers (μm); (ii) normalized haze of less than 33 percent (%), wherein actual haze is measured according to ASTM D1003-07 on a film of the composition, the film having an actual thickness of about 50 μm; and wherein the normalized haze is calculated by multiplying the actual haze times a film thickness ratio equal to 50.8 μm/(actual film thickness value); and both (i) and (ii).

7. A method of making the bimodal polyethylene-based composition of claim 1, the method comprising contacting ethylene and, optionally, a 1-alkene, with a polymerization catalyst in a first polymerization reactor under effective polymerization conditions to give the HMW PE constituent or the LMW PE constituent, but not both; conveying the HMW PE constituent or the LMW PE constituent, into a second polymerization reactor, which is different than the first polymerization reactor; in the second polymerization reactor contacting the conveyed HMW PE or LMW PE constituent, with additional ethylene, and, optionally, a second 1-alkene and, optionally, a fresh amount of a same or different effective polymerization catalyst, to give a polyethylene blend comprising the HMW PE constituent and the LMW PE constituent; melting the polyethylene blend and blending the melted polyethylene with a nucleating agent to give a melt blend comprising the nucleating agent dispersed within the melt blend of the HMW and LMW PE constituents; and cooling the melt blend to give the bimodal polyethylene-based composition.

8. A formulation comprising the bimodal polyethylene-based composition of claim 1 and at least one additive that is different than the HMW and LMW PE constituents and the nucleating agent.

9. A manufactured article comprising the bimodal polyethylene-based composition of claim 1.

10. A method of making a manufactured article, the method comprising extruding a melt of the bimodal polyethylene-based composition of claim 1, under effective conditions so as to make the manufactured article.

11. An extruded film made by extruding a melt of the bimodal polyethylene-based composition of claim 1 in a film extrusion process to give a solid film.

12. A method of protecting a moisture-sensitive material in need of such protection, the method comprising hermetically sealing the moisture-sensitive material inside a package comprising the extruded film of claim 11 to give a sealed package.

13. A sealed package made by the method of claim 12.

14. A bimodal polyethylene-based composition comprising a formulated blend of a higher molecular weight polyethylene polymer constituent (HMW PE constituent), a lower molecular weight polyethylene polymer constituent (LMW PE constituent), and at least 65 parts per million weight of a nucleating agent; and the composition having has a water vapor transmission rate (WVTR) of less than 0.23 (grams*25.4 micrometers)/(0.0645 square meter*day), as measured according to ASTM F1249-06 at 38° C., 100% relative humidity, on a film having a thickness of about 50 micrometers ($\mu m$) and a normalized haze of less than 27.0 percent (%), wherein actual haze is measured according to ASTM D1003-07 on a film of the composition, the film having an actual thickness of about 50 $\mu m$; and wherein the normalized haze is calculated by multiplying the actual haze times a film thickness ratio equal to 50.8 $\mu m$ (2.00 mils)/(actual film thickness value); and wherein each of the HMW and LMW PE constituents independently is a polyethylene homopolymer or a poly (ethylene-co-1-alkene) copolymer having from greater than 0 to 1.0 weight percent (wt %) of comonomeric content.

15. A film made from the composition of claim 14.

* * * * *